US012661737B2

(12) United States Patent
Datta et al.

(10) Patent No.: US 12,661,737 B2
(45) Date of Patent: Jun. 23, 2026

(54) INTRAVASCULAR DEVICE INCLUDING HIGH VOLTAGE COAXIAL CONDUCTOR WIRING

(71) Applicant: Biosense Webster (Israel) Ltd., Yokneam (IL)

(72) Inventors: Keshava Datta, Chino Hills, CA (US); Anand Rao, Tustin, CA (US); Thanh Nguyen, El Monte, CA (US); Thomas V. Selkee, Irvine, CA (US)

(73) Assignee: Biosense Webster (Israel) Ltd., Yokneam (IL)

( * ) Notice: Subject to any disclaimer, the term of this patent is extended or adjusted under 35 U.S.C. 154(b) by 607 days.

(21) Appl. No.: 18/065,709

(22) Filed: Dec. 14, 2022

(65) Prior Publication Data

US 2023/0226638 A1 Jul. 20, 2023

Related U.S. Application Data

(60) Provisional application No. 63/301,082, filed on Jan. 20, 2022.

(51) Int. Cl.
*H05H 1/34* (2006.01)
*B23K 11/30* (2006.01)
(52) U.S. Cl.
CPC ........... *B23K 11/3009* (2013.01); *H05H 1/34* (2013.01)
(58) Field of Classification Search
CPC ................ A61B 18/1492; A61B 5/287; A61B 2018/00267; A61B 2018/00577; A61B 5/6858; A61B 2018/00351; A61B 2018/00839; A61B 2018/0016; A61B 2018/1467; A61B 2018/00357; A61B 5/6859; A61B 2018/00214; A61B 2018/0022; A61B 2034/2051;
(Continued)

(56) References Cited

U.S. PATENT DOCUMENTS 3,952,747 A 4/1976 Kimmell, Jr.
4,699,147 A 10/1987 Chilson et al.
(Continued)

FOREIGN PATENT DOCUMENTS

CN 105761835 A 7/2016
CN 111248993 A 6/2020
(Continued)

OTHER PUBLICATIONS

Extended European Search Report dated Feb. 2, 2023, from Corresponding European Application No. 22194819.3, 8 pages.
(Continued)

*Primary Examiner* — Chris Q Liu

(57) ABSTRACT

Wiring is disclosed herein that is configured to supply IRE ablation signals through a catheter body and is resistant against dielectric breakdown, arcing, and noise during ablation. The wiring includes a highly conductive core, a conductive cover surrounding the core that has lower electrical and/or thermal conductivity than the core, and an insulative jacket surrounding the conductive cover. A catheter including such wiring may be suitable for supplying electrical signals to tissue to perform IRE ablation. In some examples, such a catheter can also be suitable for reversible electroporation and/or RF ablation.

20 Claims, 6 Drawing Sheets

(58) Field of Classification Search
CPC .... A61B 2018/00875; A61B 2218/002; A61B
2018/00613; A61B 5/283; A61B
2562/043; A61B 2018/00791; A61B
2018/00375; A61B 2018/1435; A61B
5/6852; A61B 18/1206; A61B 5/6853;
A61B 2018/00642; A61B 5/339; A61B
2017/00053; H05H 1/34; B23K 11/3009
USPC .................................................... 219/121.52
See application file for complete search history.

(56) References Cited

U.S. PATENT DOCUMENTS

| | | | |
|---|---|---|---|
| 4,940,064 A | 7/1990 | Desai | |
| 5,215,103 A | 6/1993 | Desai | |
| 5,255,679 A | 10/1993 | Imran | |
| 5,293,869 A | 3/1994 | Edwards et al. | |
| 5,309,910 A | 5/1994 | Edwards et al. | |
| 5,313,943 A | 5/1994 | Houser et al. | |
| 5,324,284 A | 6/1994 | Imran | |
| 5,345,936 A | 9/1994 | Pomeranz et al. | |
| 5,365,926 A | 11/1994 | Desai | |
| 5,396,887 A | 3/1995 | Imran | |
| 5,400,783 A | 3/1995 | Pomeranz et al. | |
| 5,411,025 A | 5/1995 | Webster, Jr. | |
| 5,415,166 A | 5/1995 | Imran | |
| 5,456,254 A | 10/1995 | Pietroski et al. | |
| 5,465,717 A | 11/1995 | Imran et al. | |
| 5,476,495 A | 12/1995 | Kordis et al. | |
| 5,499,981 A | 3/1996 | Kordis | |
| 5,526,810 A | 6/1996 | Wang | |
| 5,546,940 A | 8/1996 | Panescu et al. | |
| 5,549,108 A | 8/1996 | Edwards et al. | |
| 5,558,073 A | 9/1996 | Pomeranz et al. | |
| 5,577,509 A | 11/1996 | Panescu et al. | |
| 5,595,183 A | 1/1997 | Swanson et al. | |
| 5,598,848 A | 2/1997 | Swanson et al. | |
| 5,609,157 A | 3/1997 | Panescu et al. | |
| 5,628,313 A | 5/1997 | Webster, Jr. | |
| 5,681,280 A | 10/1997 | Rusk et al. | |
| 5,718,241 A | 2/1998 | Ben-Haim et al. | |
| 5,722,401 A | 3/1998 | Pietroski et al. | |
| 5,722,403 A | 3/1998 | McGee et al. | |
| 5,725,525 A | 3/1998 | Kordis | |
| 5,730,128 A | 3/1998 | Pomeranz et al. | |
| 5,772,590 A | 6/1998 | Webster, Jr. | |
| 5,782,239 A | 7/1998 | Webster, Jr. | |
| 5,782,899 A | 7/1998 | Imran | |
| 5,823,189 A | 10/1998 | Kordis | |
| 5,881,727 A | 3/1999 | Edwards | |
| 5,893,847 A | 4/1999 | Kordis | |
| 5,904,680 A | 5/1999 | Kordis et al. | |
| 5,911,739 A | 6/1999 | Kordis et al. | |
| 5,928,228 A | 7/1999 | Kordis et al. | |
| 5,944,022 A | 8/1999 | Nardella et al. | |
| 5,968,040 A | 10/1999 | Swanson et al. | |
| 5,983,126 A | 11/1999 | Wittkampf | |
| 6,014,579 A | 1/2000 | Pomeranz et al. | |
| 6,014,590 A | 1/2000 | Whayne et al. | |
| 6,023,638 A | 2/2000 | Swanson | |
| 6,119,030 A | 9/2000 | Morency | |
| 6,198,974 B1 | 3/2001 | Webster, Jr. | |
| 6,216,043 B1 | 4/2001 | Swanson et al. | |
| 6,216,044 B1 | 4/2001 | Kordis | |
| 6,428,537 B1 | 8/2002 | Swanson et al. | |
| 6,456,864 B1 | 9/2002 | Swanson et al. | |
| 6,484,118 B1 | 11/2002 | Govari | |
| 6,574,492 B1 | 6/2003 | Ben-Haim et al. | |
| 6,584,345 B2 | 6/2003 | Govari | |
| 6,600,948 B2 | 7/2003 | Ben-Haim et al. | |
| 6,738,655 B1 | 5/2004 | Sen et al. | |
| 6,741,878 B2 | 5/2004 | Fuimaono et al. | |
| 6,748,255 B2 | 6/2004 | Fuimaono et al. | |
| 6,780,183 B2 | 8/2004 | Jimenez, Jr. et al. | |
| 6,837,886 B2 | 1/2005 | Collins et al. | |
| 6,866,662 B2 | 3/2005 | Fuimaono et al. | |
| 6,892,091 B1 | 5/2005 | Ben-Haim et al. | |
| 6,970,730 B2 | 11/2005 | Fuimaono et al. | |
| 6,973,340 B2 | 12/2005 | Fuimaono et al. | |
| 6,980,858 B2 | 12/2005 | Fuimaono et al. | |
| 6,987,995 B2 | 1/2006 | Drysen | |
| 7,048,734 B1 | 5/2006 | Fleischman et al. | |
| 7,142,903 B2 | 11/2006 | Rodriguez et al. | |
| 7,149,563 B2 | 12/2006 | Fuimaono et al. | |
| 7,255,695 B2 | 8/2007 | Falwell et al. | |
| 7,257,434 B2 | 8/2007 | Fuimaono et al. | |
| 7,274,957 B2 | 9/2007 | Drysen | |
| 7,377,906 B2 | 5/2008 | Selkee | |
| 7,399,299 B2 | 7/2008 | Daniel et al. | |
| 7,410,486 B2 | 8/2008 | Fuimaono et al. | |
| 7,522,950 B2 | 4/2009 | Fuimaono et al. | |
| 7,591,799 B2 | 9/2009 | Selkee | |
| 7,593,760 B2 | 9/2009 | Rodriguez et al. | |
| RE41,334 E | 5/2010 | Beatty et al. | |
| 7,720,517 B2 | 5/2010 | Drysen | |
| 7,794,473 B2 | 9/2010 | Tessmer et al. | |
| 7,846,157 B2 | 12/2010 | Kozel | |
| 7,853,302 B2 | 12/2010 | Rodriguez et al. | |
| 7,930,018 B2 | 4/2011 | Harlev et al. | |
| 8,000,765 B2 | 8/2011 | Rodriguez et al. | |
| 8,007,495 B2 | 8/2011 | McDaniel et al. | |
| 8,021,327 B2 | 9/2011 | Selkee | |
| 8,048,063 B2 | 11/2011 | Aeby et al. | |
| 8,103,327 B2 | 1/2012 | Harlev et al. | |
| 8,167,845 B2 | 5/2012 | Wang et al. | |
| 8,224,416 B2 | 7/2012 | De La Rama et al. | |
| 8,235,988 B2 | 8/2012 | Davis et al. | |
| 8,275,440 B2 | 9/2012 | Rodriguez et al. | |
| 8,295,902 B2 | 10/2012 | Salahieh et al. | |
| 8,346,339 B2 | 1/2013 | Kordis et al. | |
| 8,357,152 B2 | 1/2013 | Kordis et al. | |
| 8,435,232 B2 | 5/2013 | Aeby et al. | |
| 8,447,377 B2 | 5/2013 | Harlev et al. | |
| 8,475,450 B2 | 7/2013 | Govari et al. | |
| 8,498,686 B2 | 7/2013 | Grunewald | |
| 8,517,999 B2 | 8/2013 | Pappone et al. | |
| 8,545,490 B2 | 10/2013 | Mihajlovic et al. | |
| 8,560,086 B2 | 10/2013 | Just et al. | |
| 8,567,265 B2 | 10/2013 | Aeby et al. | |
| 8,712,550 B2 | 4/2014 | Grunewald | |
| 8,728,065 B2 | 5/2014 | Fish et al. | |
| 8,755,861 B2 | 6/2014 | Harlev et al. | |
| 8,825,130 B2 | 9/2014 | Just et al. | |
| 8,906,011 B2 | 12/2014 | Gelbart et al. | |
| 8,945,120 B2 | 2/2015 | McDaniel et al. | |
| 8,979,839 B2 | 3/2015 | De La Rama et al. | |
| 9,037,264 B2 | 5/2015 | Just et al. | |
| 9,131,980 B2 | 9/2015 | Bloom | |
| 9,204,929 B2 | 12/2015 | Solis | |
| 9,277,960 B2 | 3/2016 | Weinkam et al. | |
| 9,314,208 B1 | 4/2016 | Altmann et al. | |
| 9,339,331 B2 | 5/2016 | Tegg et al. | |
| 9,486,282 B2 | 11/2016 | Solis | |
| 9,554,718 B2 | 1/2017 | Bar-Tal et al. | |
| D782,686 S | 3/2017 | Werneth et al. | |
| 9,585,588 B2 | 3/2017 | Marecki et al. | |
| 9,597,036 B2 | 3/2017 | Aeby et al. | |
| 9,687,297 B2 | 6/2017 | Just et al. | |
| 9,693,733 B2 | 7/2017 | Altmann et al. | |
| 9,782,099 B2 | 10/2017 | Williams et al. | |
| 9,788,895 B2 | 10/2017 | Solis | |
| 9,801,681 B2 | 10/2017 | Laske et al. | |
| 9,814,618 B2 | 11/2017 | Nguyen et al. | |
| 9,833,161 B2 | 12/2017 | Govari | |
| 9,848,795 B2 | 12/2017 | Marecki et al. | |
| 9,894,756 B2 | 2/2018 | Weinkam et al. | |
| 9,895,073 B2 | 2/2018 | Solis | |
| 9,907,609 B2 | 3/2018 | Cao et al. | |
| 9,974,460 B2 | 5/2018 | Wu et al. | |
| 9,986,949 B2 | 6/2018 | Govari et al. | |
| 9,993,160 B2 | 6/2018 | Salvestro et al. | |
| 10,014,607 B1 | 7/2018 | Govari et al. | |
| 10,028,376 B2 | 7/2018 | Weinkam et al. | |
| 10,034,637 B2 | 7/2018 | Harlev et al. | |

(56) References Cited

U.S. PATENT DOCUMENTS

| | | | |
|---|---|---|---|
| 10,039,494 B2 | 8/2018 | Altmann et al. | |
| 10,045,707 B2 | 8/2018 | Govari | |
| 10,078,713 B2 | 9/2018 | Auerbach et al. | |
| 10,111,623 B2 | 10/2018 | Jung et al. | |
| 10,130,420 B2 | 11/2018 | Basu et al. | |
| 10,136,828 B2 | 11/2018 | Houben et al. | |
| 10,143,394 B2 | 12/2018 | Solis | |
| 10,172,536 B2 | 1/2019 | Maskara et al. | |
| 10,182,762 B2 | 1/2019 | Just et al. | |
| 10,194,818 B2 | 2/2019 | Williams et al. | |
| 10,201,311 B2 | 2/2019 | Chou et al. | |
| 10,219,860 B2 | 3/2019 | Harlev et al. | |
| 10,219,861 B2 | 3/2019 | Just et al. | |
| 10,231,328 B2 | 3/2019 | Weinkam et al. | |
| 10,238,309 B2 | 3/2019 | Bar-Tal et al. | |
| 10,278,590 B2 | 5/2019 | Salvestro et al. | |
| D851,774 S | 6/2019 | Werneth et al. | |
| 10,314,505 B2 | 6/2019 | Williams et al. | |
| 10,314,507 B2 | 6/2019 | Govari et al. | |
| 10,314,648 B2 | 6/2019 | Ge et al. | |
| 10,314,649 B2 | 6/2019 | Bakos et al. | |
| 10,342,608 B2 | 7/2019 | Wang et al. | |
| 10,349,855 B2 | 7/2019 | Zeidan et al. | |
| 10,350,003 B2 | 7/2019 | Weinkam et al. | |
| 10,362,991 B2 | 7/2019 | Tran et al. | |
| 10,375,827 B2 | 8/2019 | Weinkam et al. | |
| 10,376,170 B2 | 8/2019 | Quinn et al. | |
| 10,376,221 B2 | 8/2019 | Iyun et al. | |
| 10,398,348 B2 | 9/2019 | Osadchy et al. | |
| 10,403,053 B2 | 9/2019 | Katz et al. | |
| 10,441,188 B2 | 10/2019 | Katz et al. | |
| 10,470,682 B2 | 11/2019 | Deno et al. | |
| 10,470,714 B2 | 11/2019 | Altmann et al. | |
| 10,482,198 B2 | 11/2019 | Auerbach et al. | |
| 10,492,857 B2 | 12/2019 | Guggenberger et al. | |
| 10,542,620 B2 | 1/2020 | Weinkam et al. | |
| 10,575,743 B2 | 3/2020 | Basu et al. | |
| 10,575,745 B2 | 3/2020 | Solis | |
| 10,582,871 B2 | 3/2020 | Williams et al. | |
| 10,582,894 B2 | 3/2020 | Ben Zrihem et al. | |
| 10,596,346 B2 | 3/2020 | Aeby et al. | |
| 10,602,947 B2 | 3/2020 | Govari et al. | |
| 10,617,467 B2 | 4/2020 | Viswanathan et al. | |
| 10,617,867 B2 | 4/2020 | Viswanathan et al. | |
| 10,660,702 B2 | 5/2020 | Viswanathan et al. | |
| 10,667,753 B2 | 6/2020 | Werneth et al. | |
| 10,674,929 B2 | 6/2020 | Houben et al. | |
| 10,681,805 B2 | 6/2020 | Weinkam et al. | |
| 10,682,181 B2 | 6/2020 | Cohen et al. | |
| 10,687,892 B2 | 6/2020 | Long et al. | |
| 10,688,278 B2 | 6/2020 | Beeckler et al. | |
| 10,702,178 B2 | 7/2020 | Dahlen et al. | |
| 10,716,477 B2 | 7/2020 | Salvestro et al. | |
| 10,758,304 B2 | 9/2020 | Aujla | |
| 10,765,371 B2 | 9/2020 | Hayam et al. | |
| 10,772,566 B2 | 9/2020 | Aujila | |
| 10,799,281 B2 | 10/2020 | Goertzen et al. | |
| 10,842,558 B2 | 11/2020 | Harlev et al. | |
| 10,842,561 B2 | 11/2020 | Viswanathan et al. | |
| 10,863,914 B2 | 12/2020 | Govari et al. | |
| 10,881,376 B2 | 1/2021 | Shemesh et al. | |
| 10,898,139 B2 | 1/2021 | Guta et al. | |
| 10,905,329 B2 | 2/2021 | Bar-Tal et al. | |
| 10,912,484 B2 | 2/2021 | Ziv-Ari et al. | |
| 10,918,306 B2 | 2/2021 | Govari et al. | |
| 10,939,871 B2 | 3/2021 | Altmann et al. | |
| 10,952,795 B2 | 3/2021 | Cohen et al. | |
| 10,973,426 B2 | 4/2021 | Williams et al. | |
| 10,973,461 B2 | 4/2021 | Baram et al. | |
| 10,987,045 B2 | 4/2021 | Basu et al. | |
| 11,006,902 B1 | 5/2021 | Bonyak et al. | |
| 11,040,208 B1 | 6/2021 | Govari et al. | |
| 11,045,628 B2 | 6/2021 | Beeckler et al. | |
| 11,051,877 B2 | 7/2021 | Sliwa et al. | |
| 11,071,585 B2 | 7/2021 | Zhang et al. | |
| 11,109,788 B2 | 9/2021 | Rottmann et al. | |
| 11,116,435 B2 | 9/2021 | Urman et al. | |
| 11,129,574 B2 | 9/2021 | Cohen et al. | |
| 11,160,482 B2 | 11/2021 | Solis | |
| 11,164,371 B2 | 11/2021 | Yellin et al. | |
| 11,540,877 B2 * | 1/2023 | Altmann | A61B 18/1492 |
| 11,660,135 B2 * | 5/2023 | Govari | A61B 18/1233 606/41 |
| 11,707,320 B2 * | 7/2023 | Altmann | A61B 18/1492 606/42 |
| 11,903,638 B2 * | 2/2024 | Altmann | A61B 18/1206 |
| 12,042,216 B2 * | 7/2024 | Govari | A61B 18/1492 |
| 2002/0198522 A1 | 12/2002 | Kordis et al. | |
| 2004/0210121 A1 | 10/2004 | Fuimaono et al. | |
| 2006/0009689 A1 | 1/2006 | Fuimaono et al. | |
| 2006/0009690 A1 | 1/2006 | Fuimaono et al. | |
| 2006/0058813 A1 | 3/2006 | Teague et al. | |
| 2006/0100669 A1 | 5/2006 | Fuimaono et al. | |
| 2007/0093806 A1 | 4/2007 | Desai et al. | |
| 2007/0276212 A1 | 11/2007 | Fuimaono et al. | |
| 2008/0234564 A1 | 9/2008 | Beatty et al. | |
| 2009/0149848 A1 | 6/2009 | Werneth et al. | |
| 2010/0063478 A1 | 3/2010 | Selkee | |
| 2011/0118726 A1 | 5/2011 | De La Rama et al. | |
| 2011/0160574 A1 | 6/2011 | Harlev et al. | |
| 2011/0190625 A1 | 8/2011 | Harlev et al. | |
| 2011/0245756 A1 | 10/2011 | Arora et al. | |
| 2011/0301597 A1 | 12/2011 | McDaniel et al. | |
| 2012/0271136 A1 | 10/2012 | Kordis et al. | |
| 2012/0271138 A1 | 10/2012 | Kordis et al. | |
| 2012/0271140 A1 | 10/2012 | Kordis et al. | |
| 2013/0090651 A1 | 4/2013 | Smith | |
| 2013/0150693 A1 | 6/2013 | D'Angelo | |
| 2013/0172715 A1 | 7/2013 | Just et al. | |
| 2013/0172872 A1 | 7/2013 | Subramaniam et al. | |
| 2013/0172883 A1 | 7/2013 | Lopes et al. | |
| 2013/0178850 A1 | 7/2013 | Lopes et al. | |
| 2013/0190587 A1 | 7/2013 | Lopes et al. | |
| 2013/0296852 A1 | 11/2013 | Madjarov et al. | |
| 2014/0025069 A1 | 1/2014 | Willard et al. | |
| 2014/0052118 A1 | 2/2014 | Laske et al. | |
| 2014/0088588 A1 | 3/2014 | Jarrard | |
| 2014/0180147 A1 | 6/2014 | Thakur et al. | |
| 2014/0180151 A1 | 6/2014 | Maskara et al. | |
| 2014/0180152 A1 | 6/2014 | Maskara et al. | |
| 2014/0257069 A1 | 9/2014 | Eliason et al. | |
| 2014/0276712 A1 | 9/2014 | Mallin et al. | |
| 2014/0276746 A1 | 9/2014 | Nabutovsky et al. | |
| 2014/0288552 A1 | 9/2014 | Kunis | |
| 2014/0309512 A1 | 10/2014 | Govari et al. | |
| 2014/0309513 A1 | 10/2014 | Fish et al. | |
| 2014/0350551 A1 | 11/2014 | Raatikka et al. | |
| 2015/0011991 A1 | 1/2015 | Buysman et al. | |
| 2015/0045863 A1 | 2/2015 | Litscher et al. | |
| 2015/0080693 A1 | 3/2015 | Solis | |
| 2015/0105770 A1 | 4/2015 | Amit | |
| 2015/0119878 A1 | 4/2015 | Heisel et al. | |
| 2015/0133919 A1 | 5/2015 | McDaniel et al. | |
| 2015/0208942 A1 | 7/2015 | Bar-Tal et al. | |
| 2015/0223757 A1 | 8/2015 | Werneth et al. | |
| 2015/0250424 A1 | 9/2015 | Govari et al. | |
| 2015/0270634 A1 | 9/2015 | Buesseler et al. | |
| 2015/0282859 A1 | 10/2015 | Bencn et al. | |
| 2015/0342491 A1 | 12/2015 | Marecki et al. | |
| 2015/0342532 A1 | 12/2015 | Basu et al. | |
| 2015/0351625 A1 | 12/2015 | Schroth et al. | |
| 2015/0366508 A1 | 12/2015 | Chou et al. | |
| 2016/0081746 A1 | 3/2016 | Solis | |
| 2016/0113582 A1 | 4/2016 | Altmann et al. | |
| 2016/0113709 A1 | 4/2016 | Maor | |
| 2016/0183877 A1 | 6/2016 | Williams et al. | |
| 2016/0228023 A1 | 8/2016 | Govari | |
| 2016/0228062 A1 | 8/2016 | Altmann et al. | |
| 2016/0278853 A1 | 9/2016 | Ogle et al. | |
| 2016/0302858 A1 | 10/2016 | Bencini | |
| 2016/0324573 A1 | 11/2016 | Mickelson et al. | |
| 2016/0338770 A1 | 11/2016 | Bar-Tal et al. | |
| 2017/0027638 A1 | 2/2017 | Solis | |
| 2017/0035496 A1 | 2/2017 | Nagale et al. | |

(56)         References Cited

U.S. PATENT DOCUMENTS

| | | |
|---|---|---|
| 2017/0065227 A1 | 3/2017 | Marrs et al. |
| 2017/0071543 A1 | 3/2017 | Basu et al. |
| 2017/0071544 A1 | 3/2017 | Basu et al. |
| 2017/0071665 A1 | 3/2017 | Solis |
| 2017/0095173 A1 | 4/2017 | Bar-Tal et al. |
| 2017/0100187 A1 | 4/2017 | Basu et al. |
| 2017/0143227 A1 | 5/2017 | Marecki et al. |
| 2017/0156790 A1 | 6/2017 | Aujla |
| 2017/0164858 A1 | 6/2017 | Basu |
| 2017/0172442 A1 | 6/2017 | Govari |
| 2017/0172651 A1 | 6/2017 | Gross et al. |
| 2017/0185702 A1 | 6/2017 | Auerbach et al. |
| 2017/0202515 A1 | 7/2017 | Zrihem et al. |
| 2017/0221262 A1 | 8/2017 | Laughner et al. |
| 2017/0224958 A1 | 8/2017 | Cummings et al. |
| 2017/0265812 A1 | 9/2017 | Williams et al. |
| 2017/0281031 A1 | 10/2017 | Houben et al. |
| 2017/0281268 A1 | 10/2017 | Tran et al. |
| 2017/0296125 A1 | 10/2017 | Altmann et al. |
| 2017/0296251 A1 | 10/2017 | Wu et al. |
| 2017/0319140 A1 | 11/2017 | Wu et al. |
| 2017/0347959 A1 | 12/2017 | Guta et al. |
| 2017/0354338 A1 | 12/2017 | Levin et al. |
| 2017/0354339 A1 | 12/2017 | Zeidan et al. |
| 2017/0354364 A1 | 12/2017 | Bar-Tal et al. |
| 2018/0000540 A1 | 1/2018 | Ogle et al. |
| 2018/0008203 A1 | 1/2018 | Iyun et al. |
| 2018/0028084 A1 | 2/2018 | Williams et al. |
| 2018/0049803 A1 | 2/2018 | Solis |
| 2018/0085064 A1 | 3/2018 | Auerbach et al. |
| 2018/0116595 A1 | 5/2018 | Ruppersberg |
| 2018/0132749 A1 | 5/2018 | Govari et al. |
| 2018/0137687 A1 | 5/2018 | Katz et al. |
| 2018/0160936 A1 | 6/2018 | Govari et al. |
| 2018/0160978 A1 | 6/2018 | Cohen et al. |
| 2018/0168511 A1 | 6/2018 | Hall et al. |
| 2018/0184982 A1 | 7/2018 | Basu et al. |
| 2018/0192958 A1 | 7/2018 | Wu |
| 2018/0192959 A1 | 7/2018 | Mou et al. |
| 2018/0206792 A1 | 7/2018 | Auerbach et al. |
| 2018/0228439 A1 | 8/2018 | Wu et al. |
| 2018/0235692 A1 | 8/2018 | Efimov et al. |
| 2018/0249959 A1 | 9/2018 | Osypka |
| 2018/0256109 A1 | 9/2018 | Wu et al. |
| 2018/0279954 A1 | 10/2018 | Hayam et al. |
| 2018/0303414 A1 | 10/2018 | Toth et al. |
| 2018/0303546 A1 | 10/2018 | Buysman et al. |
| 2018/0310987 A1 | 11/2018 | Altmann et al. |
| 2018/0311497 A1 | 11/2018 | Viswanathan et al. |
| 2018/0338722 A1 | 11/2018 | Altmann et al. |
| 2018/0344188 A1 | 12/2018 | Govari |
| 2018/0344202 A1 | 12/2018 | Bar-Tal et al. |
| 2018/0344251 A1 | 12/2018 | Harlev et al. |
| 2018/0344393 A1 | 12/2018 | Gruba et al. |
| 2018/0360534 A1 | 12/2018 | Teplitsky et al. |
| 2018/0365355 A1 | 12/2018 | Auerbach et al. |
| 2019/0000540 A1 | 1/2019 | Cohen et al. |
| 2019/0008582 A1 | 1/2019 | Govari et al. |
| 2019/0015007 A1 | 1/2019 | Rottmann et al. |
| 2019/0030328 A1 | 1/2019 | Stewart et al. |
| 2019/0053708 A1 | 2/2019 | Gliner |
| 2019/0059766 A1 | 2/2019 | Houben et al. |
| 2019/0069950 A1 | 3/2019 | Viswanathan et al. |
| 2019/0069954 A1 | 3/2019 | Cohen et al. |
| 2019/0117111 A1 | 4/2019 | Osadchy et al. |
| 2019/0117303 A1 | 4/2019 | Claude et al. |
| 2019/0117315 A1 | 4/2019 | Keyes et al. |
| 2019/0125338 A1 | 5/2019 | Shelton, IV et al. |
| 2019/0125437 A1 | 5/2019 | Govari et al. |
| 2019/0125439 A1 | 5/2019 | Rohl et al. |
| 2019/0133552 A1 | 5/2019 | Shemesh et al. |
| 2019/0142293 A1 | 5/2019 | Solis |
| 2019/0164633 A1 | 5/2019 | Ingel et al. |
| 2019/0167137 A1 | 6/2019 | Bar-Tal et al. |
| 2019/0167140 A1 | 6/2019 | Williams et al. |
| 2019/0188909 A1 | 6/2019 | Yellin et al. |
| 2019/0201664 A1 | 7/2019 | Govari |
| 2019/0209089 A1 | 7/2019 | Baram et al. |
| 2019/0216346 A1 | 7/2019 | Ghodrati et al. |
| 2019/0216347 A1 | 7/2019 | Ghodrati et al. |
| 2019/0231421 A1 | 8/2019 | Viswanathan et al. |
| 2019/0231423 A1 | 8/2019 | Weinkam et al. |
| 2019/0239811 A1 | 8/2019 | Just et al. |
| 2019/0246935 A1 | 8/2019 | Govari et al. |
| 2019/0298442 A1 | 10/2019 | Ogata et al. |
| 2019/0314083 A1 | 10/2019 | Herrera et al. |
| 2019/0328260 A1 | 10/2019 | Zeidan et al. |
| 2019/0336210 A1 | 11/2019 | Beeckler et al. |
| 2019/0343580 A1 | 11/2019 | Nguyen et al. |
| 2019/0350567 A1 | 11/2019 | Cummins et al. |
| 2019/0350647 A1 | 11/2019 | Ramberg et al. |
| 2020/0000518 A1 | 1/2020 | Kiernan et al. |
| 2020/0008705 A1 | 1/2020 | Ziv-Ari et al. |
| 2020/0008869 A1 | 1/2020 | Byrd |
| 2020/0009378 A1 | 1/2020 | Stewart et al. |
| 2020/0015876 A1 | 1/2020 | Chou et al. |
| 2020/0015890 A1 | 1/2020 | To et al. |
| 2020/0022653 A1 | 1/2020 | Moisa |
| 2020/0029845 A1 | 1/2020 | Baram et al. |
| 2020/0046421 A1 | 2/2020 | Govari |
| 2020/0046423 A1 | 2/2020 | Viswanathan et al. |
| 2020/0060569 A1 | 2/2020 | Tegg |
| 2020/0077959 A1 | 3/2020 | Altmann et al. |
| 2020/0093539 A1 | 3/2020 | Long et al. |
| 2020/0129089 A1 | 4/2020 | Gliner et al. |
| 2020/0129125 A1 | 4/2020 | Govari et al. |
| 2020/0129128 A1 | 4/2020 | Gliner et al. |
| 2020/0179650 A1 | 6/2020 | Beeckler et al. |
| 2020/0196896 A1 | 6/2020 | Solis |
| 2020/0197082 A1 | 6/2020 | Daniel et al. |
| 2020/0205689 A1 | 7/2020 | Squires et al. |
| 2020/0205690 A1 | 7/2020 | Williams et al. |
| 2020/0205737 A1 | 7/2020 | Beeckler |
| 2020/0205876 A1 | 7/2020 | Govari |
| 2020/0205892 A1 | 7/2020 | Viswanathan et al. |
| 2020/0206461 A1 | 7/2020 | Govari et al. |
| 2020/0206498 A1 | 7/2020 | Arora et al. |
| 2020/0289197 A1 | 9/2020 | Viswanathan et al. |
| 2020/0297234 A1 | 9/2020 | Houben et al. |
| 2020/0297281 A1 | 9/2020 | Basu et al. |
| 2020/0305726 A1 | 10/2020 | Salvestro et al. |
| 2020/0305946 A1 | 10/2020 | DeSimone et al. |
| 2020/0375657 A1 | 12/2020 | Olson et al. |
| 2020/0397328 A1 | 12/2020 | Altmann et al. |
| 2020/0398048 A1 | 12/2020 | Krimsky et al. |
| 2021/0015549 A1 | 1/2021 | Haghighi-Mood et al. |
| 2021/0022684 A1 | 1/2021 | Govari et al. |
| 2021/0045805 A1 | 2/2021 | Govari et al. |
| 2021/0059549 A1 | 3/2021 | Urman et al. |
| 2021/0059550 A1 | 3/2021 | Urman et al. |
| 2021/0059608 A1 | 3/2021 | Beeckler et al. |
| 2021/0059743 A1 | 3/2021 | Govari |
| 2021/0059747 A1 | 3/2021 | Krans et al. |
| 2021/0077180 A1 | 3/2021 | Govari et al. |
| 2021/0077184 A1 | 3/2021 | Basu et al. |
| 2021/0082157 A1 | 3/2021 | Rosenberg et al. |
| 2021/0085200 A1 | 3/2021 | Auerbach et al. |
| 2021/0085204 A1 | 3/2021 | Auerbach et al. |
| 2021/0085215 A1 | 3/2021 | Auerbach et al. |
| 2021/0085387 A1 | 3/2021 | Amit et al. |
| 2021/0093292 A1 | 4/2021 | Baram et al. |
| 2021/0093294 A1 | 4/2021 | Shemesh et al. |
| 2021/0093374 A1 | 4/2021 | Govari et al. |
| 2021/0093376 A1 | 4/2021 | Harlev et al. |
| 2021/0093377 A1 | 4/2021 | Herrera et al. |
| 2021/0100612 A1 | 4/2021 | Baron et al. |
| 2021/0113822 A1 | 4/2021 | Beeckler et al. |
| 2021/0127999 A1 | 5/2021 | Govari et al. |
| 2021/0128010 A1 | 5/2021 | Govari et al. |
| 2021/0133516 A1 | 5/2021 | Govari et al. |
| 2021/0145282 A1 | 5/2021 | Bar-Tal et al. |
| 2021/0161582 A1 | 6/2021 | Byrd et al. |
| 2021/0161592 A1 | 6/2021 | Altmann et al. |
| 2021/0162210 A1 | 6/2021 | Altmann et al. |

(56) References Cited

U.S. PATENT DOCUMENTS

| | | |
|---|---|---|
| 2021/0169421 A1 | 6/2021 | Govari |
| 2021/0169550 A1 | 6/2021 | Govari et al. |
| 2021/0169567 A1 | 6/2021 | Govari et al. |
| 2021/0169568 A1 | 6/2021 | Govari et al. |
| 2021/0177294 A1 | 6/2021 | Gliner et al. |
| 2021/0177356 A1 | 6/2021 | Gliner et al. |
| 2021/0177503 A1 | 6/2021 | Altmann et al. |
| 2021/0178166 A1 | 6/2021 | Govari et al. |
| 2021/0186363 A1 | 6/2021 | Gliner et al. |
| 2021/0186604 A1 | 6/2021 | Altmann et al. |
| 2021/0187241 A1 | 6/2021 | Govari et al. |
| 2021/0187254 A1 | 6/2021 | Beeckler et al. |
| 2021/0196372 A1 | 7/2021 | Altmann et al. |
| 2021/0196394 A1 | 7/2021 | Govari et al. |
| 2021/0212591 A1 | 7/2021 | Govari et al. |
| 2021/0219904 A1 | 7/2021 | Yarnitsky et al. |
| 2021/0236815 A1 | 8/2021 | Waldstreicher et al. |
| 2021/0278936 A1 | 9/2021 | Katz et al. |
| 2021/0282659 A1 | 9/2021 | Govari et al. |
| 2021/0307815 A1 | 10/2021 | Govari et al. |
| 2021/0308424 A1 | 10/2021 | Beeckler et al. |
| 2021/0338319 A1 | 11/2021 | Govari et al. |
| 2021/0369339 A1 | 12/2021 | Salazar et al. |
| 2022/0071695 A1 | 3/2022 | Beeckler et al. |
| 2022/0071696 A1 | 3/2022 | Beeckler et al. |
| 2022/0110679 A1 | 4/2022 | Wang et al. |
| 2022/0304745 A1 | 9/2022 | Oloson |
| 2022/0387051 A1 | 12/2022 | Girdhar |
| 2023/0000550 A1 | 1/2023 | Nedved et al. |
| 2023/0130692 A1 | 4/2023 | Wang et al. |
| 2023/0225790 A1 | 7/2023 | Okarski |
| 2023/0346455 A1 | 11/2023 | Beeckler et al. |
| 2023/0346459 A1 | 11/2023 | Beeckler et al. |
| 2023/0346462 A1 | 11/2023 | Beeckler et al. |
| 2023/0346464 A1 | 11/2023 | Beeckler et al. |
| 2024/0216045 A1 | 7/2024 | Keyes |
| 2025/0057589 A1 | 2/2025 | Sandquist et al. |

FOREIGN PATENT DOCUMENTS

| | | |
|---|---|---|
| CN | 111248996 A | 6/2020 |
| EP | 0668740 A1 | 8/1995 |
| EP | 0644738 B1 | 3/2000 |
| EP | 0727183 B1 | 11/2002 |
| EP | 0727184 B1 | 12/2002 |
| EP | 2201905 A1 | 6/2010 |
| EP | 2783651 A1 | 10/2014 |
| EP | 2699151 B1 | 11/2015 |
| EP | 2699152 B1 | 11/2015 |
| EP | 2699153 B1 | 12/2015 |
| EP | 2498706 B1 | 4/2016 |
| EP | 2578173 B1 | 6/2017 |
| EP | 3181082 A1 | 6/2017 |
| EP | 3238645 A1 | 11/2017 |
| EP | 2884931 B1 | 1/2018 |
| EP | 3315086 A1 | 5/2018 |
| EP | 2349440 B1 | 8/2019 |
| EP | 3318211 B1 | 12/2019 |
| EP | 3581135 A1 | 12/2019 |
| EP | 2736434 B1 | 2/2020 |
| EP | 3451962 B1 | 3/2020 |
| EP | 3791816 A2 | 3/2021 |
| EP | 3972510 A1 | 3/2022 |
| EP | 4115834 A1 | 1/2023 |
| WO | 9421167 A1 | 9/1994 |
| WO | 9421169 A1 | 9/1994 |
| WO | 9625095 A1 | 8/1996 |
| WO | 9634560 A1 | 11/1996 |
| WO | 0182814 B1 | 5/2002 |
| WO | 2004087249 A2 | 10/2004 |
| WO | 2012100185 A2 | 7/2012 |
| WO | 2013052852 A1 | 4/2013 |
| WO | 2013162884 A1 | 10/2013 |
| WO | 2013173917 A1 | 11/2013 |
| WO | 2013176881 A1 | 11/2013 |
| WO | 2014176205 A1 | 10/2014 |
| WO | 2016019760 A1 | 2/2016 |
| WO | 2016044687 A1 | 3/2016 |
| WO | 2018111600 A1 | 6/2018 |
| WO | 2018191149 A1 | 10/2018 |
| WO | 2019084442 A1 | 5/2019 |
| WO | 2019143960 A1 | 7/2019 |
| WO | 2020026217 A1 | 2/2020 |
| WO | 2020194216 A1 | 10/2020 |
| WO | 2020206328 A1 | 10/2020 |
| WO | 2021126980 A1 | 6/2021 |
| WO | 2022001908 A1 | 1/2022 |

OTHER PUBLICATIONS

Extended European Search Report and Opinion dated Jun. 1, 2023, from corresponding European Application No. 23152493.5.

Extended European Search Report and Opinion dated Jun. 7, 2023, from corresponding European Application No. 23152399.4.

Extended European Search Report and Opinion dated Jun. 12, 2023, from corresponding European Application No. 23152448.9.

Extended European Search Report dated Jun. 13, 2023, from Corresponding European Application No. 23152458.8, 12 pages.

Extended European Search Report and Opinion dated Sep. 6, 2023, from corresponding European Application No. 23152472.9.

Extended European Search Report & Search Opinion dated Sep. 19, 2023, from corresponding European Application No. 23170325.7.

Extended European Search Report & Search Opinion dated Sep. 21, 2023, from corresponding European Application No. 23170230.9.

Extended European Search Report & Search Opinion dated Sep. 21, 2023, from corresponding European Application No. 23170409.9.

Extended European Search Report & Search Opinion dated Jan. 2, 2024, from corresponding European Application No. 23170297.8.

* cited by examiner

1

INTRAVASCULAR DEVICE INCLUDING HIGH VOLTAGE COAXIAL CONDUCTOR WIRING

CROSS REFERENCE TO RELATED APPLICATIONS

This application claims the benefit of priority under 35 U.S.C. § 119 to prior filed U.S. Provisional Patent Application No. 63/301,082, filed Jan. 20, 2022, the entire contents of which is hereby incorporated by reference as if set forth in full herein.

FIELD

The present invention relates generally to ablation catheters, and particularly to ablation catheters having wiring suitable to withstand high voltages applied during ablation, for instance during pulsed field ablation (PFA), also referred to herein as irreversible electroporation (IRE).

BACKGROUND

Cardiac arrhythmia, such as atrial fibrillation, occurs when regions of cardiac tissue abnormally conduct electric signals to adjacent tissue, thereby disrupting the normal cardiac cycle and causing asynchronous rhythm. Sources of undesired signals are typically located in tissue of the atria and ventricle. Regardless of source, unwanted signals are conducted elsewhere through heart tissue where they can initiate or continue arrhythmia.

Treatment of cardiac arrhythmia can include inserting an elongated catheter through patient vasculature and into a heart and applying electrical signals to ablate cardiac tissue, thereby disrupting conductive pathways of electrical signals causing arrhythmia. The ablation serves to cease or modify the propagation of unwanted electrical signals from one portion of the heart to another. Presently the most common ablation technique involves applying radio frequency (RF) electrical signals via electrodes to tissue to generate heat. Irreversible electroporation (IRE) ablation (pulse field ablation) is a more recently developed technique which involves applying short duration high voltage pulses between electrodes in a biphasic way across tissue to cause cell death.

Generally, structures for a catheter suitable for RF ablation and a catheter suitable for IRE ablation can be similar, and some catheters may be suitable for both RF and IRE ablation. However, differences in electrical signal application including waveform shape, voltage amplitude, etc. as well as geometry of electrodes at a target site may result in diverging design considerations for RF and IRE ablation catheters. Generally, IRE ablation signals include short pulses having a higher voltage amplitude (suitable to induce electric fields across cells to induce irreversible electroporation) while RF ablation signals are continuous sinusoids having a lower voltage amplitude.

Current typical ablation practices utilize RF ablation alone, with some treatments utilizing IRE ablation alone. U.S. Patent Pub. Nos. 2021/0161592, 2021/0169550, and 2021/0177503, each incorporated by reference herein and attached in the Appendix to priority application U.S. 63/301, 082, each disclose a respective system suitable for both RF and IRE ablation in a single treatment and also illustrate differences between RF and IRE signals applied during ablation.

IRE ablation to treat cardiac arrhythmia typically requires voltages of about 900 V or greater when in a bipolar configuration. Voltage this high through the existing wiring can degrade the insulation which allows for more arcing. Given the size and biocompatibility constraints of the devices used to treat cardiac arrhythmia the positioning and dimensions of the wiring cannot be altered to compensate for these effects. Thus, new materials are needed for the wiring.

SUMMARY

Examples presented herein generally include wiring configured to supply IRE ablation signals through a catheter body that are resistant against dielectric breakdown, arcing, and noise during ablation. The wiring includes a highly conductive core, a conductive cover surrounding the core that has lower electrical and/or thermal conductivity than the core, and an insulative jacket surrounding the conductive cover. An intravascular device (e.g. catheter) including such wiring may be suitable for supplying electrical signals to tissue to perform IRE ablation. In some examples, such an intravascular device can also be suitable for reversible electroporation and/or RF ablation.

A first example intravascular device can include an elongated shaft, a distal section, and a plurality of wires. The elongated shaft can extend along a longitudinal axis. The elongated shaft can be sized to traverse vasculature. The distal section can include a plurality of electrodes configured to deliver at least 900 Volts for irreversible electroporation. The plurality of wires each can be electrically joined to a respective electrode of the plurality of electrodes. Each of the wires can extend through at least a portion of the elongated shaft. Each of the wires can respectively include an electrically conductive core material having a first electrical conductivity and an electrically conductive cover material circumscribing the electrically conductive core material and having a second electrical conductivity less than the first electrical conductivity. Each of the wires can also respectively include an insulative jacket circumscribing the electrically conductive cover material such that no electrical arc is generated between the plurality of wires during delivery of at least 900 Volts to each electrode.

The electrically conductive core material can include about 12% to about 50% of silver.

The electrically conductive core material can include about 28% to about 33% of silver.

The electrically conductive core material can include about 12% to about 50% of copper.

The first electrical conductivity (of the core material) can measure about $4 \times 10^7$ S/m to about $6 \times 10^7$ S/m when measured at 20° C.

The second electrical conductivity (of the cover material) can measure about $1 \times 10^6$ S/m when measured at 20° C.

The first electrical conductivity can measure at least ten times greater than the second electrical conductivity when measured at 20° C.

The electrically conductive core material can have a first thermal conductivity, and the electrically conductive cover material can have a second thermal conductivity less than the first thermal conductivity.

The first thermal conductivity can be about 300 Watts per millikelvin (W/mK) to about 400 W/mK.

The second thermal conductivity can be about 11.2 W/mK.

The first thermal conductivity can be at least ten times the second thermal conductivity.

Each of the wires can have a resistance per length of wire measuring about 1.4 Ohms per foot ($\Omega$/ft) (4.6 $\Omega$/m) to about 1.8 $\Omega$/ft (5.8 $\Omega$/m).

Each of the wires of can have a wire resistance of about 10 Ohms ($\Omega$) to about 12$\Omega$.

The electrically conductive cover material of each wire can have a diameter measuring between about 0.0031 inches (79 micrometers or microns) to about 0.0040 inches (102 micrometers).

A second example intravascular device can include an elongated shaft, a distal section, and a plurality of wires. The elongated shaft can extend along a longitudinal axis and can be sized to traverse vasculature. The distal section can include a plurality of electrodes. The wires can each be electrically joined to a respective electrode of the plurality of electrodes. Each of the wires can extend through at least a portion of the elongated shaft. Each of the wires can respectively include a plurality of strands, each strand respectively including an electrically conductive core material having a first electrical conductivity and an electrically conductive cover material circumscribing the core material and having a second electrical conductivity less than the first electrical conductivity. Each wire can also include an insulative jacket circumscribing the plurality of strands so that no electrical arc is generated between the plurality of wires when at least 900 Volts is provided to each electrode.

The electrically conductive core material of each of the strands can include about 41% silver (Ag).

Each strand can have a diameter measuring about 0.002 inches (51 micrometers).

At least a portion of the wires can have exactly four (4) strands.

At least a portion of the strands can have a resistance of about 20$\Omega$.

Each of the wires can be configured to withstand bipolar pulses resulting in a voltage difference of about 1,500 volts to about 2,000 volts between two wires.

Each of the wires can be configured to withstand bipolar pulses resulting in a voltage difference of about 1,500 volts between two wires in the plurality of wires.

Each of the wires can be configured to withstand bipolar pulses resulting in a voltage difference of about 1,800 volts between two wires in the plurality of wires.

The first example intravascular device and/or the second intravascular device can be configured such that the distal section includes a lasso region upon which the plurality of electrodes are mounted. The lasso region can be configured to move between an elongated configuration aligned to the longitudinal axis to a circular shape generally orthogonal to the longitudinal axis.

The first example intravascular device and/or the second intravascular device can be configured such that the distal section includes a plurality of spines upon which the plurality of electrodes are mounted. The spines can be configured to move from an elongated configuration aligned to the longitudinal axis such that the spines bow outwardly from the longitudinal axis to form an expanded form.

The first example intravascular device and/or the second intravascular device can be configured such that the plurality of wires includes 12 to 8 wires.

The first example intravascular device and/or the second intravascular device can be configured such that the elongated shaft can have a diameter of about 8.5 French (2.8 millimeters).

The first example intravascular device and/or the second intravascular device can be configured such that the plurality of wires are bundled in an insulative sleeve.

The first example intravascular device and/or the second intravascular device can be configured such that each wire of the plurality of wires comprising a diameter measuring about 0.0053 inches (130 micrometers).

The first example intravascular device and/or the second intravascular device can be configured such that the insulative jacket has a wall thickness measuring about 0.0008 inches (20 micrometers) to about 0.00125 inches (32 micrometers).

The first example intravascular device and/or the second intravascular device can be configured such that the electrically conductive cover material includes about 33% to about 37% nickel, about 30% to about 38% cobalt, about 19% to about 21% chromium, and about 9% to about 10.5% molybdenum.

The first example intravascular device and/or the second intravascular device can be configured such that the electrically conductive cover material further includes about 1% iron.

The first example intravascular device and/or the second intravascular device can be configured such that the electrically conductive cover material further includes less than 1% of at least one element of a group of elements consisting of: carbon, manganese, silicon, phosphorus, sulfur, titanium, and boron.

BRIEF DESCRIPTION OF THE DRAWINGS

The above and further aspects of this invention are further discussed with reference to the following description in conjunction with the accompanying drawings, in which like numerals indicate like structural elements and features in various figures. The drawings are not necessarily to scale, emphasis instead being placed upon illustrating principles of the invention. The figures depict one or more implementations of the inventive devices, by way of example only, not by way of limitation.

DETAILED DESCRIPTION

Figure 1:
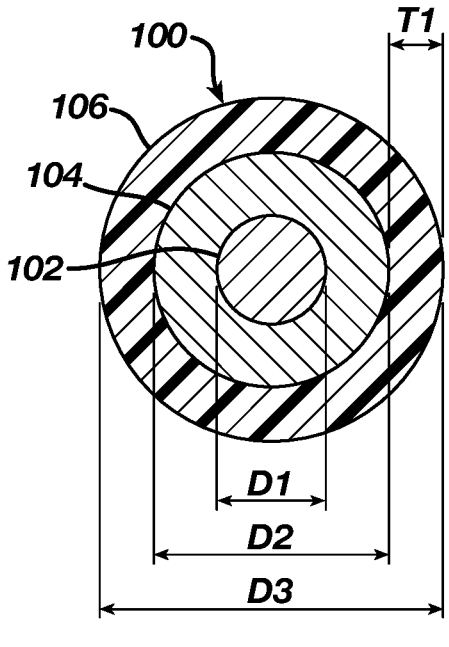
FIG. 1 is an illustration of an example solid core wire according to aspects of the present invention.

The following detailed description should be read with reference to the drawings, in which like elements in different drawings are identically numbered. The drawings, which are not necessarily to scale, depict selected embodiments and are not intended to limit the scope of the invention. The detailed description illustrates by way of example, not by way of limitation, the principles of the invention. This description will clearly enable one skilled in the art to make and use the invention, and describes several embodiments, adaptations, variations, alternatives and uses of the invention, including what is presently believed to be the best mode of carrying out the invention.

As used herein, the terms "about" or "approximately" for any numerical values or ranges indicate a suitable dimensional tolerance that allows the part or collection of components to function for its intended purpose as described herein. More specifically, "about" or "approximately" may refer to the range of values ±10% of the recited value, e.g. "about 90%" may refer to the range of values from 81% to 99%.

As discussed herein, vasculature of a "patient," "host," "user," and "subject" can be vasculature of a human or any animal. It should be appreciated that an animal can be a variety of any applicable type, including, but not limited thereto, mammal, veterinarian animal, livestock animal or pet type animal, etc. As an example, the animal can be a laboratory animal specifically selected to have certain characteristics similar to a human (e.g., rat, dog, pig, monkey, or the like). It should be appreciated that the subject can be any applicable human patient, for example.

As discussed herein, "operator" and "user" can include a doctor, surgeon, technician, scientist, or any other individual or delivery instrumentation associated with delivery of a multi-electrode catheter for treatments disclosed herein.

As discussed herein, the term "ablate" or "ablation", as it relates to the devices and corresponding systems of this disclosure, refers to components and structural features configured to reduce or prevent the generation of erratic cardiac signals in the cells by utilizing non-thermal energy, such as irreversible electroporation (IRE), referred throughout this disclosure interchangeably as pulsed field ablation (PFA). Ablating or ablation as it relates to the devices and corresponding systems of this disclosure is used throughout this disclosure in reference to ablation of cardiac tissue for certain conditions including, but not limited to, arrhythmias, atrial flutter ablation, pulmonary vein isolation, supraventricular tachycardia ablation, and ventricular tachycardia ablation. The term "ablate" or "ablation" also includes known methods, devices, and systems to achieve various forms of bodily tissue ablation as understood by a person skilled in the relevant art.

As discussed herein, the terms "bipolar" and "unipolar" when used to refer to IRE ablation schemes describe ablation schemes which differ with respect to electrical current path and electric field distribution. "Bipolar" refers to an IRE ablation scheme utilizing a current path between two electrodes that are both positioned at a treatment site; current density and electric flux density is typically approximately equal at each of the two electrodes. "Unipolar" refers to an IRE ablation scheme utilizing a current path between two electrodes where one electrode having a high current density and high electric flux density is positioned at a treatment site, and a second electrode having comparatively lower current density and lower electric flux density is positioned remotely from the treatment site.

As discussed herein, the terms "biphasic pulse" and "monophasic pulse" refer to respective electrical signals. "Biphasic pulse" refers to an electrical signal having a positive-voltage phase pulse (referred to herein as "positive phase") and a negative-voltage phase pulse (referred to herein as "negative phase"). "Monophasic pulse" refers to an electrical signal having only a positive or only a negative phase. Preferably, a system providing the biphasic pulse is configured to prevent application of a direct current voltage (DC) to a patient. For instance, the average voltage of the biphasic pulse can be zero volts with respect to ground or other common reference voltage. Additionally, or alternatively, the system can include a capacitor or other protective component. Where voltage amplitude of the biphasic and/or monophasic pulse is described herein, it is understood that the expressed voltage amplitude is an absolute value of the approximate peak amplitude of each of the positive-voltage phase and/or the negative-voltage phase. Each phase of the biphasic and monophasic pulse preferably has a square shape having an essentially constant voltage amplitude during a majority of the phase duration. Phases of the biphasic pulse are separated in time by an interphase delay. The interphase delay duration is preferably less than or approximately equal to the duration of a phase of the biphasic pulse. The interphase delay duration is more preferably about 25% of the duration of the phase of the biphasic pulse.

As discussed herein, the terms "tubular" and "tube" are to be construed broadly and are not limited to a structure that is a right cylinder or strictly circumferential in cross-section or of a uniform cross-section throughout its length. For example, the tubular structures are generally illustrated as a substantially right cylindrical structure. However, the tubular structures may have a tapered or curved outer surface without departing from the scope of the present disclosure.

The present disclosure is related to systems, method or uses and devices for IRE ablation of cardiac tissue to treat cardiac arrhythmias. Ablative energies can be provided to cardiac tissue by a tip portion of a catheter which can deliver ablative energy to the tissue to be ablated. Some example catheters include three-dimensional structures at the tip portion and are configured to administer ablative energy from various electrodes positioned on the three-dimensional structures. Ablative procedures incorporating such example catheters can be visualized using fluoroscopy.

Ablation of cardiac tissue using application of a thermal technique, such as radio frequency (RF) energy and cryoablation, to correct a malfunctioning heart is a well-known procedure. Typically, to successfully ablate using a thermal technique, cardiac electropotentials need to be measured at various locations of the myocardium. In addition, temperature measurements during ablation provide data enabling the efficacy of the ablation. Typically, for an ablation procedure using a thermal technique, the electropotentials and the temperatures are measured before, during, and after the actual ablation. RF approaches can have risks that can lead to tissue charring, burning, steam pop, phrenic nerve palsy, pulmonary vein stenosis, and esophageal fistula. Cryoablation is an alternative approach to RF ablation that can reduce some thermal risks associated with RF ablation. However maneuvering cryoablation devices and selectively applying cryoablation is generally more challenging compared to RF ablation; therefore, cryoablation is not viable in certain anatomical geometries which may be reached by electrical ablation devices.

While RF ablation and cryoablation are based on thermal energy transfer to induce local tissue necrosis, the solution of this disclosure resolves these and other problems by utilizing irreversible electroporation (IRE). IRE as discussed in this disclosure is a non-thermal cell death technology that can be used for ablation of atrial arrhythmias. To ablate using IRE/PEF, biphasic voltage pulses are applied to disrupt cellular structures of myocardium. The biphasic pulses are non-sinusoidal and can be tuned to target cells based on electrophysiology of the cells. In contrast, to ablate using RF, a sinusoidal voltage waveform is applied to produce heat at the treatment area, indiscriminately heating all cells in the treatment area. IRE therefore has the capability to spare adjacent heat sensitive structures or tissues which would be of benefit in the reduction of possible complications known with ablation or isolation modalities. Additionally, or alternatively, monophasic pulses can be utilized.

Electroporation can be induced by applying a pulsed electric field across biological cells to cause reversable (temporary) or irreversible (permanent) creation of pores in the cell membrane. Reversible electroporation utilizes pulsed electrical signals similar to IRE, however electricity applied with the electrodes is below the electric field threshold of the target tissue allowing cells to repair. The cells have a transmembrane electrostatic potential that is increased above a resting potential upon application of the pulsed electric field. While the transmembrane electrostatic potential remains below a threshold potential, the electroporation is reversable, meaning the pores can close when the applied pulse electric field is removed, and the cells can self-repair and survive. If the transmembrane electrostatic potential increases beyond the threshold potential, the electroporation is irreversible, and the cells become permanently permeable. As a result, the cells die due to a loss of homeostasis and typically die by apoptosis. Generally, cells of differing types have differing threshold potential. For instance, heart cells have a threshold potential of approximately 500 V/cm, whereas for bone it is 3000 V/cm. These differences in threshold potential allow IRE to selectively target tissue based on threshold potential.

The solution of this disclosure includes systems and methods for applying electrical signals from catheter electrodes positioned in the vicinity of myocardial tissue to generate a pulsed electric field effective to induce electroporation in the myocardial tissue. The systems and methods can be effective to ablate targeted tissue by inducing irreversible electroporation. In some examples, the systems and methods can be effective to induce reversible electroporation as part of a diagnostic procedure. Reversible electroporation can temporarily interrupt electrical activation signals through targeted myocardial tissue to allow for observation of changes in electrical activity within the heart which can be used to predict the outcome of irreversible electroporation at the targeted tissue. Temporarily interrupted electrical activation signals induced through reversible electroporation can resume as the cells self-repair.

The pulsed electric field, and its effectiveness to induce reversible and/or irreversible electroporation, can be affected by physical parameters of the system and biphasic pulse parameters of the electrical signal. Physical parameters can include electrode contact area, electrode spacing, electrode geometry, etc. Examples presented herein generally include physical parameters adapted to effectively induce reversible and/or irreversible electroporation. Biphasic pulse parameters of the electrical signal can include voltage amplitude, pulse duration, pulse interphase delay, inter-pulse delay, total application time, delivered energy, etc. In some examples, parameters of the electrical signal can be adjusted to induce both reversible and irreversible electroporation given the same physical parameters. Examples of various systems and methods of ablation including IRE are presented in U.S. Patent Pub. Nos. 2021/0169550, 2021/0169567, 2021/0169568, 2021/0161592, 2021/0196372, 2021/0177503, and 2021/0186604 the entireties of each of which are incorporated herein by reference and attached in the Appendix to priority application U.S. 63/301,082. Example systems and methods for reversible electroporation are disclosed in U.S. Patent Pub. No. 2021/0162210 the entirety of which is incorporated herein by reference and attached in the Appendix to priority application U.S. 63/301,082.

FIG. 1 is an illustration of an example solid core wire 100 having a dual layer conductor including an electrically conductive core 102, an electrically conductive cover 104. The solid core wire 100 further includes an insulative jacket 106 over the conductive cover 104. The conductive core 102 can have a higher electrical conductivity than the conductive cover 104 to reduce likelihood of arcing or ionization between adjacent wires and/or reduce electrical signal noise in a catheter in which the wires are configured to deliver electrical energy the electrodes for IRE ablation. IRE ablation for atrial fibrillation can require voltage of between about 900 Volts and higher than 2,500 Volts between electrodes in bipolar mode, resulting in a corresponding voltage difference between wires in the catheter. In comparison, voltages applied during RF ablation can typically range between 10 to 200 Volts. The higher voltage, shorter duration electrical pulses applied during IRE ablation can present greater likelihood of noise, ionization, and/or arcing between wires compared to lower voltage sinusoidal signals applied during RF ablation. The example wire 100 can mitigate noise, ionization, and/or arcing in some example catheters compared to known typical solid core wire having a uniform conductor material.

In some examples, the solid core wire 100 can be configured such that no electrical arc is generated between wires during delivery of at least 900 Volts to each electrode. In some examples the wire 100 can be configured such that no electrical arc is generated between wires during delivery of between about 1,500 Volts and about 2,000 Volts. In some examples the wire 100 can be configured such that no electrical arc is generated between wires during delivery of about 1,800 Volts.

The conductive core 102 preferably has a high electrical conductivity to result in a higher current density in the conductive core 102 compared to the conductive cover 104. To that end, the conductive core 102 can include highly conductive material such as copper or silver. In some examples, the material of the conductive core 102 can include about 12% to about 50% of silver and/or copper. For instance, the electrically conductive core material can include about 12% to about 50% of silver, preferably about 28% to about 33% of silver. In some examples, the material of the conductive core 102 can include about 12% to about 50% of copper. Alternatively, the conductive core 102 can include materials not listed here to achieve similar electrical and/or thermal conductivity to the material compositions of the conductive core 102 that are disclosed herein as understood by a person skilled in the pertinent art.

The material of the electrically conductive cover 104 can include a material having a lower electrical conductivity compared to the conductive core 102. The material of the conductive cover 104 can include about 33% to about 37% nickel, about 30% to about 38% cobalt, about 19% to about 21% chromium, and about 9% to about 10.5% molybdenum, similar to 35N LT® wire by Fort Wayne Metals in Fort Wayne Indiana, USA. Alternatively, the conductive cover 104 can include materials not listed here to achieve similar electrical and/or thermal conductivity to the material compositions of conductive cover 104 that are disclosed herein as understood by a person skilled in the pertinent art.

The electrical conductivity of the material of the conductive core 102 can measure about $4 \times 10^7$ S/m to about $6 \times 10^7$ S/m when measured at 20° C.

The electrical conductivity of the material of the conductive cover 104 can measure about $1 \times 10^6$ S/m when measured at 20° C.

The electrical conductivity of the material of the core 102 can measure at least ten times greater than the electrical conductivity of the material of the cover 104 when measured at 20° C.

The material of the conductive core 102 can have a thermal conductivity that is greater than thermal conductivity of the material of the conductive cover 104.

The material of the conductive core 102 can have thermal conductivity of about 300 W/mK to about 400 W/mK. The material of the conductive cover 104 can have a thermal conductivity can be about 11.2 W/mK.

The thermal conductivity of the material of the conductive core 102 can be at least ten times the thermal conductivity of the material of the conductive cover 104.

The wire 100 can have a resistance per length of wire measuring about 1.4 $\Omega$/ft (4.6 $\Omega$/m) to about 1.8 $\Omega$/ft (5.8 $\Omega$/m).

The cover 104 can have a diameter D2 measuring between about 0.0031 inches (79 micrometers) to about 0.0040 inches (102 micrometers).

The insulative jacket 106 can define a diameter D3 of the wire that measures about 0.0053 inches (130 micrometers).

The insulative jacket 106 can have a wall thickness T1 measuring about 0.0008 inches (20 micrometers) to about 0.00125 inches (32 micrometers).

Figure 2:
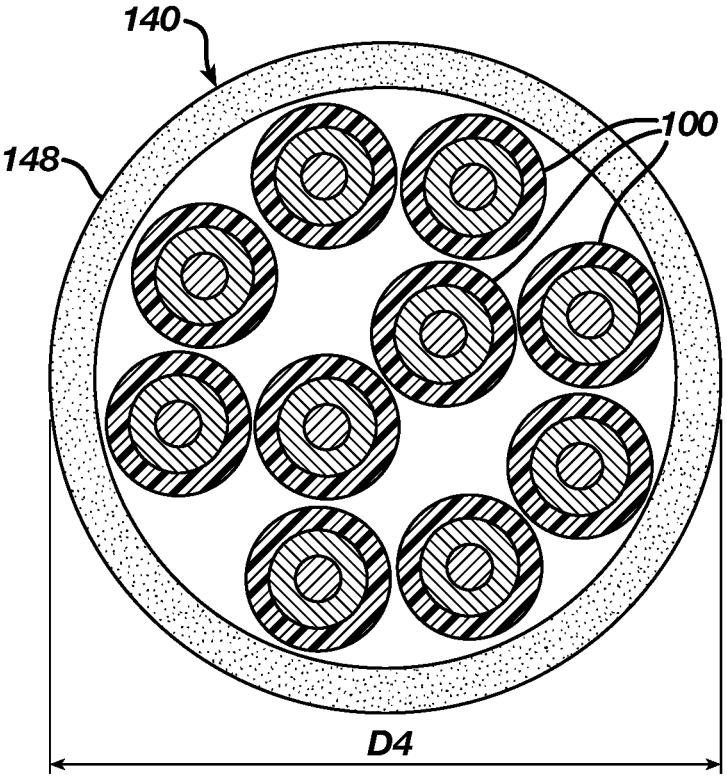
FIG. 2 is an illustration of an example wire bundle of solid core wires according to aspects of the present invention.

FIG. 2 is an illustration of an example wire bundle 140 of solid core wires 100. The wire bundle 140 can include an insulative sleeve 148 that surrounds the wires 100. Each wire 100 in the wire bundle 140 can be connected to an electrode configured to deliver electrical energy for ablation, preferably IRE ablation, therefore the wire bundle 140 can include a number of wires equal to the number of ablation electrodes of the catheter. The wire bundle 140 can include eight (8) to twelve (12) wires 100, preferably ten (10) wires as illustrated.

Figure 3:
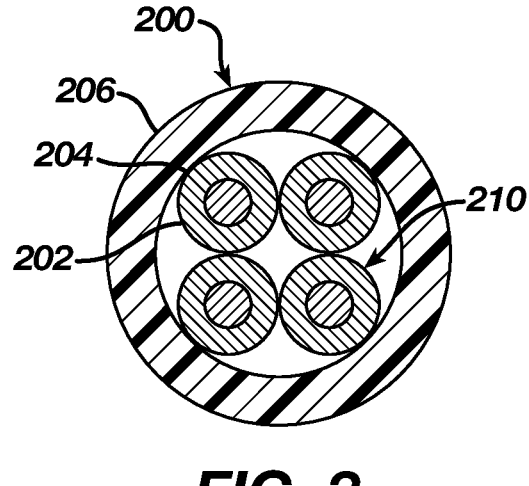
FIG. 3 is an illustration of an example stranded wire according to aspects of the present invention.

FIG. 3 is an illustration of an example stranded wire 200. The stranded wire 200 can include a number of strands 210. Each strand 210 can include a dual layer conductor including an electrically conductive core 202 and an electrically conductive cover 204. The stranded wire 200 further includes an insulative jacket 206 over the strands 210. The conductive core 202 can have a higher electrical conductivity than the conductive cover 204 to reduce likelihood of arcing or ionization between adjacent wires and/or reduce electrical signal noise in a catheter in which the wires are configured to deliver electrical energy the electrodes for IRE ablation similar to as described in relation to the solid core wire 100 illustrated in FIG. 1. The conductive core 202 can have similar material properties (e.g., electrical conductivity and thermal conductivity) as the conductive core 102 of the solid core wire 100 illustrated in FIG. 1. The conductive core 202 can have similar material composition as the conductive core 102 of the sold core wire 100 illustrated in FIG. 1. The conductive cover 204 can have similar material properties (e.g., electrical conductivity and thermal conductivity) as the conductive cover 104 of the solid core wire 100 illustrated in FIG. 1. The conductive cover 204 can have similar material composition as the conductive cover 104 of the sold core wire 100 illustrated in FIG. 1.

In some examples, the stranded wire 200 can be configured such that no electrical arc is generated between wires during delivery of at least 900 Volts to each electrode. In some examples the wire 200 can be configured such that no electrical arc is generated between wires during delivery of between about 1,500 Volts and about 2,000 Volts. In some examples the wire 200 can be configured such that no electrical arc is generated between wires during delivery of about 1,800 Volts.

Figure 4:
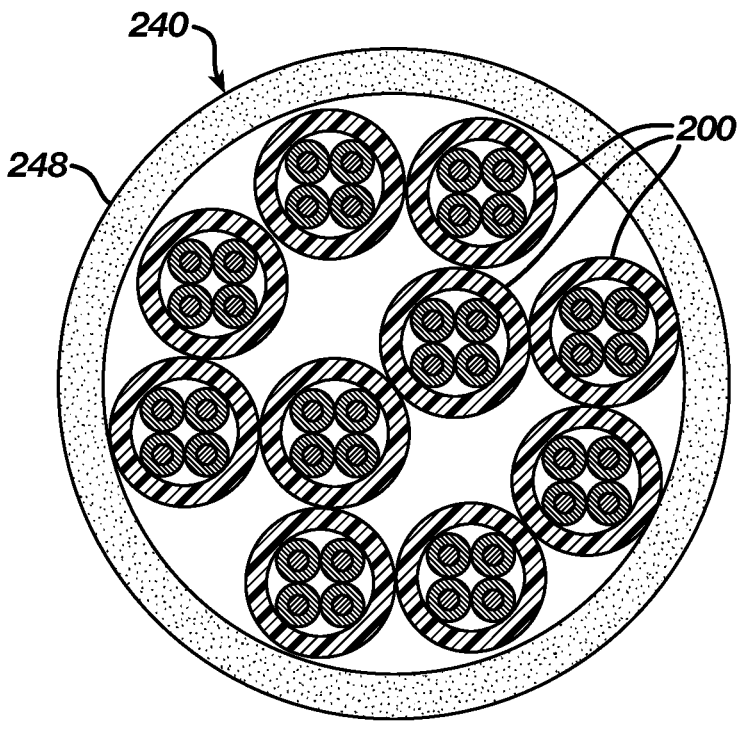
FIG. 4 is an illustration of an example wire bundle of stranded wires according to aspects of the present invention.

FIG. 4 is an illustration of an example wire bundle 240 of stranded wires 200. The wire bundle 240 can include an insulative sleeve 248 that surrounds the wires 200. Each wire 200 in the wire bundle 240 can be connected to an electrode configured to deliver electrical energy for ablation, preferably IRE ablation, therefore the wire bundle 240 can include a number of wires equal to the number of ablation electrodes of the catheter. The wire bundle 240 can include eight (8) to twelve (12) wires, preferably ten (10) wires 200 as illustrated.

Figure 5:
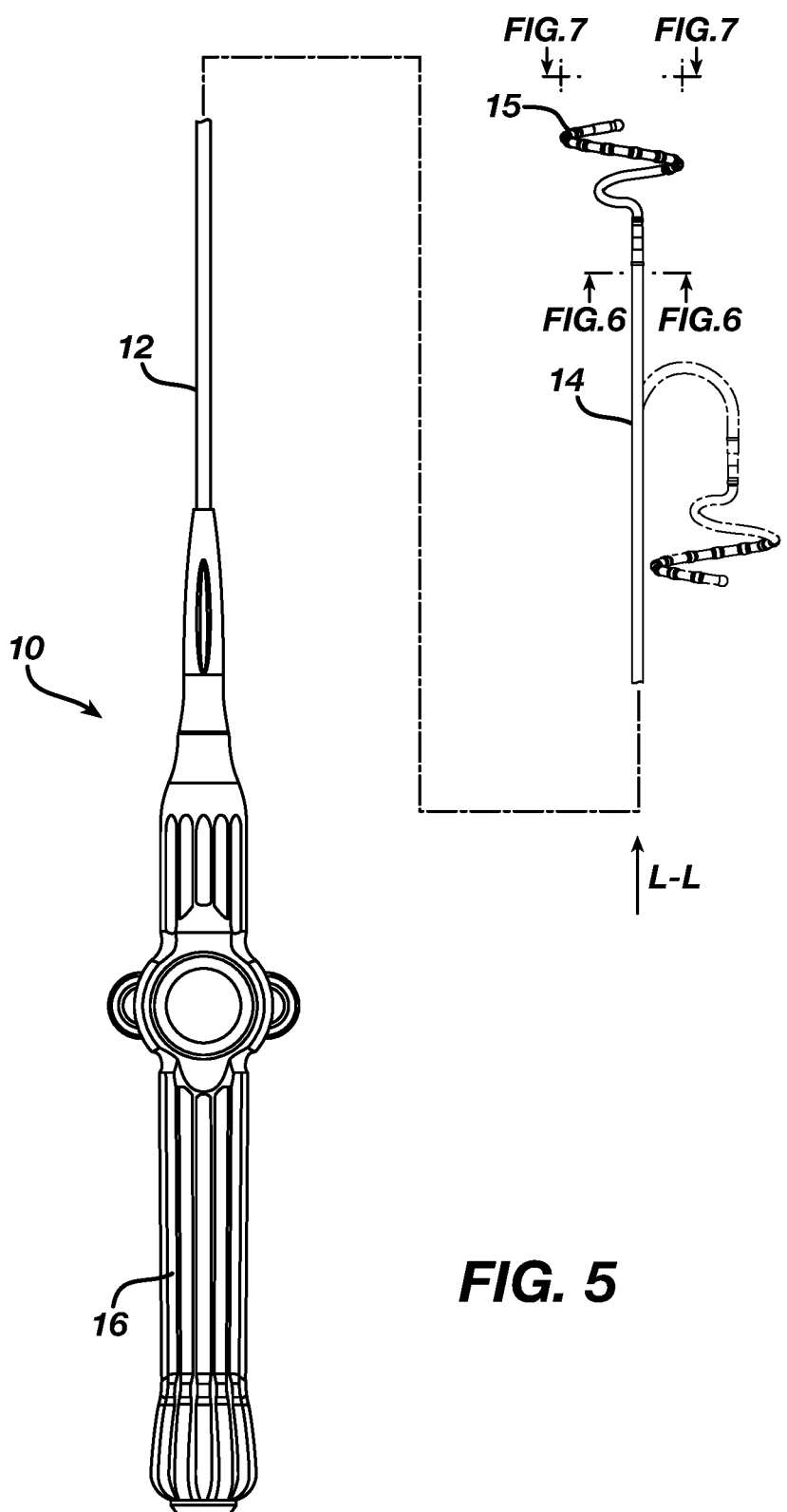
FIG. 5 is an illustration of a profile view of an example catheter according at aspects of the present invention.

FIG. 5 is an illustration of a profile view of an example catheter 10 that can include a plurality of wires including example solid core wires 100 and/or example stranded wires 200. The catheter 10 includes a distal section 15 having a circular region that is generally traverse to a longitudinal axis L-L defined by an elongated shaft 12 of the catheter 10. The catheter 10 includes an intermediate section 14 extended along the longitudinal axis L-L distal from the elongated shaft 12. The intermediate section 14 can deflect from the longitudinal axis L-L in response to manipulation of a handle 16 at a proximal end of the catheter 10. As illustrated, the intermediate section 14 can be capable of bending approximately 180°.

In an example treatment, a suitable guiding sheath is inserted into the patient with its distal end positioned at a desired treatment location. An example of a suitable guiding sheath for use with the example catheter 10 is the Vizigo™ Braiding Guiding Sheath, commercially available from Biosense Webster, Inc. (California, USA). The distal end of the sheath is guided into one of the atria. As the catheter 10 is fed through the guiding sheath, the distal section 15 is straightened to fit through the sheath. Once the distal end of the catheter is positioned at the desired treatment location, the guiding sheath is pulled proximally, allowing the intermediate section 14 and the distal section 15 to extend outside the sheath, and the distal section 15 is free to move to its circular shape. The distal section is then inserted into a pulmonary vein or other tubular region (such as the coronary sinus, superior vena cava, or inferior vena cava) so that the outer circumference of the distal section 15 is in contact with a circumference inside the tubular region.

Wires 100, 200 in the catheter 10 can have a length of about 7 ft, or 2 m. Each of the wires 100, 200 of can have a wire resistance of about 10 $\Omega$ to about 12$\Omega$.

Figure 6:
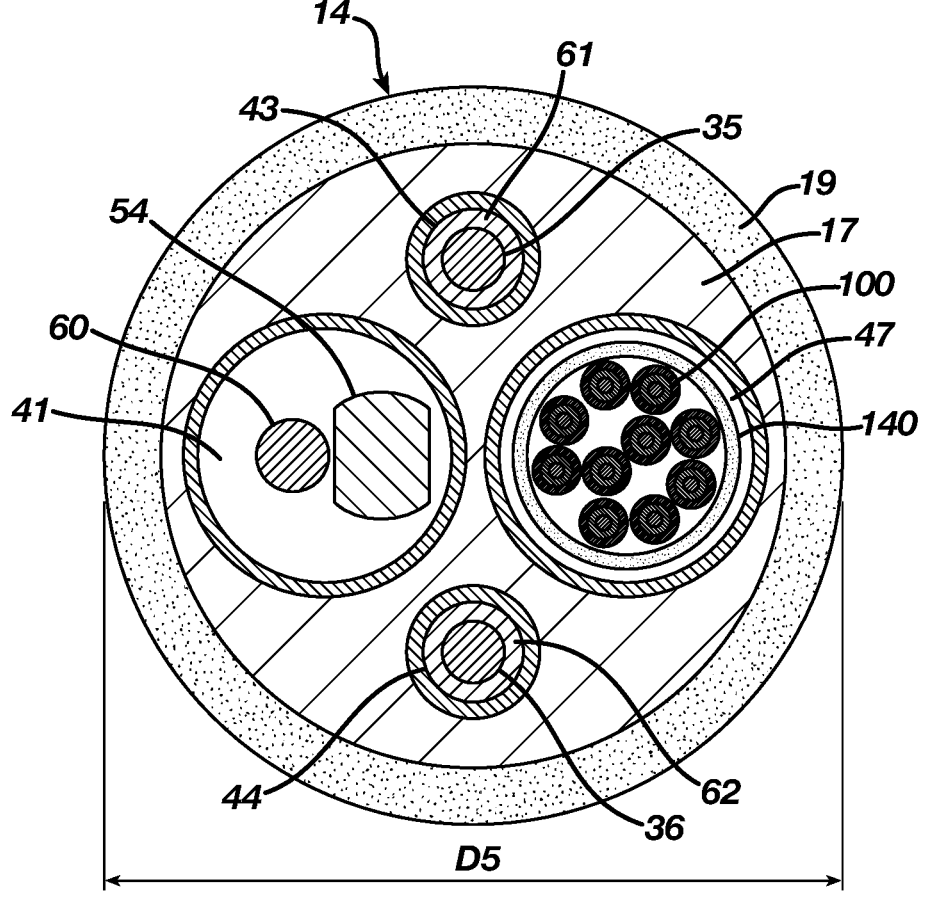
FIG. 6 is an illustration of a cross-sectional view of the example catheter as indicated in FIG. 5.

FIG. 6 is an illustration of a cross-sectional view of the example catheter 10 as indicated in FIG. 5. The intermediate section 14 includes an inner, intermediate tube 17 having four lumens 41, 43, 44, 47 therethrough. The intermediate tube 17 can be modified to include alternative numbers of lumens as understood by a person skilled in the pertinent art according to the teachings herein. The catheter 10 includes a support member 54 having a proximal end affixed within a first lumen 41 of the intermediate section 14. The support member 54 can extend into the distal section 15 of the catheter to form the distal section 15 into the circular shape. The catheter 10 includes a first pull wire/contraction wire 35 extending from the handle 16, through the shaft 12, through a second lumen 43 within the intermediate tube 17. Manipulation of the handle 16 can cause tension in the contraction wire 35 to cause the distal section 15 to contract in diameter. Within the second lumen 43, the catheter 10 can include a compression coil 61 circumscribing the contraction wire 35.

The catheter 10 includes a second pull wire/deflection wire 36 extending from the control handle 16, through the shaft, and through at least a portion of a third lumen 44 of the intermediate tube 17. The intermediate section 14 can be configured to deflect from the longitudinal axis L-L in response to manipulation of the deflection wire 36 by the control handle 16. Within the third lumen 44, the catheter 10 can include a compression coil 62 circumscribing the deflection wire 36.

The catheter 10 can include a navigation sensor assembly 60 that extends from the handle 16 through the first lumen 41 in the intermediate tube 17 and into the distal section 15.

The catheter 10 can include lead wires 100 extending proximally from electrodes 26 on the distal region 15, through a fourth lumen 47 through the intermediate tube 17, through the shaft 12, through the control handle 16, and terminate at their proximal end in a connector (not shown) which is connected to an appropriate system configured to receive electrical signals for mapping and/or transmit energy for ablation. The lead wires 100 can be attached to the electrodes 26 of the distal region 15 by any compatible conventional technique. The lead wires 100 can be individually insulated and bundled within the insulating sleeve 148 to form the wire bundle 140. The lead wires can be solid core wires 100 as illustrated and/or stranded wires 200.

The catheter 10 can include an outer tube 19 circumscribing the intermediate tube 17 and configured to provide structural stability to the intermediate section 14.

Figure 7:
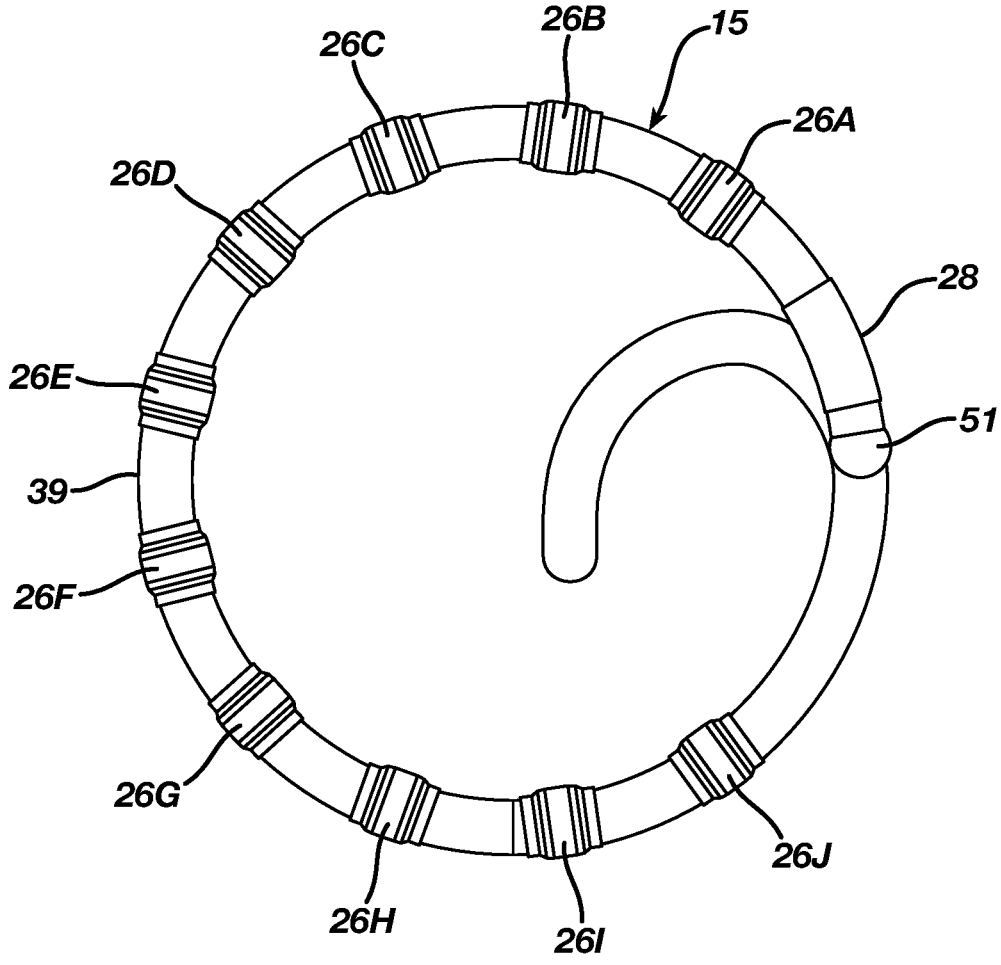
FIG. 7 is an illustration of an end view of the example catheter as indicated in FIG. 5.

FIG. 7 is an illustration of a distal end view of the example catheter 10 as indicated in FIG. 5. The generally circular distal region 15 can curve in a clockwise direction or a counterclockwise direction. The distal region 15 can contract in a radial direction. When uncontracted, the distal region 15 can have an outer diameter preferably ranging from about 25 mm to about 35 mm. The distal region 15 can have an outer diameter when contracted preferably ranging from about 15 mm to about 25 mm.

The catheter 10 is preferably configured to provide IRE ablation voltage pulses from the electrodes 26A-J. IRE is a predominantly non-thermal process, which causes an increase of the tissue temperature by, at most, a few degrees for a few milliseconds. It thus differs from RF (radio frequency) ablation, which raises the tissue temperature by between 20 and 70° C. and destroys cells through heating. IRE can utilize monophasic pulses or biphasic pulses. The IRE pulses, alone or in combination with RF ablation, can be generated and applied in various treatments such as described in references attached in the Appendix to priority application U.S. 63/301,082.

In one example treatment, voltage pulses can be applied in a triplet sequence to perform IRE ablation. In a first triplet of the triplet sequence, a biphasic pulse can be applied between a first pair of adjacent electrodes 26A, 26B, next a biphasic pulse of similar amplitude can be applied between a second pair of adjacent electrodes 26B, 26C, and next a biphasic pulse of about twice the amplitude of the previous biphasic pulses can be applied between alternate electrodes 26A, 26C from the previous two pairs of adjacent electrodes. The triplet sequence can continue with a second triplet that includes two adjacent electrodes 26B, 26C from the first triplet and a new adjacent electrode 26D. The second triplet can follow a similar pattern of the first triplet with a biphasic pulse between a first pair of adjacent electrodes 26B, 26C, next a biphasic pulse of similar amplitude between a second pair of adjacent electrodes 26C, 26D, and next a biphasic pulse of about twice the amplitude between alternate electrodes 26B, 26D. The triplet sequence can continue with a third triplet with the next three electrodes 26C, 26D, 26E, a fourth triplet with the next three electrodes 26D, 26E, 26F, a fifth triplet with the next three electrodes 26E, 26F, 26G, a sixth triplet with the next three electrodes 26F, 26G, 26H, a seventh triplet with the next three electrodes 26G, 26H, 26I, and an eighth triplet with the next three electrodes 26H, 26I, 26J. The triplet pattern can repeat, starting again at the first triplet. The catheter 10 is preferably configured to withstand biphasic pulses between adjacent electrodes having an amplitude of about 900 Volts and biphasic pulses between alternate electrodes having an amplitude of about 1,800 Volts. Alternatively, the catheter 10 can be configured to withstand biphasic and/or monophasic pulses suitable for IRE and having a voltage amplitude as disclosed elsewhere herein and/or in the Appendix to priority application U.S. 63/301,082.

Figure 8:
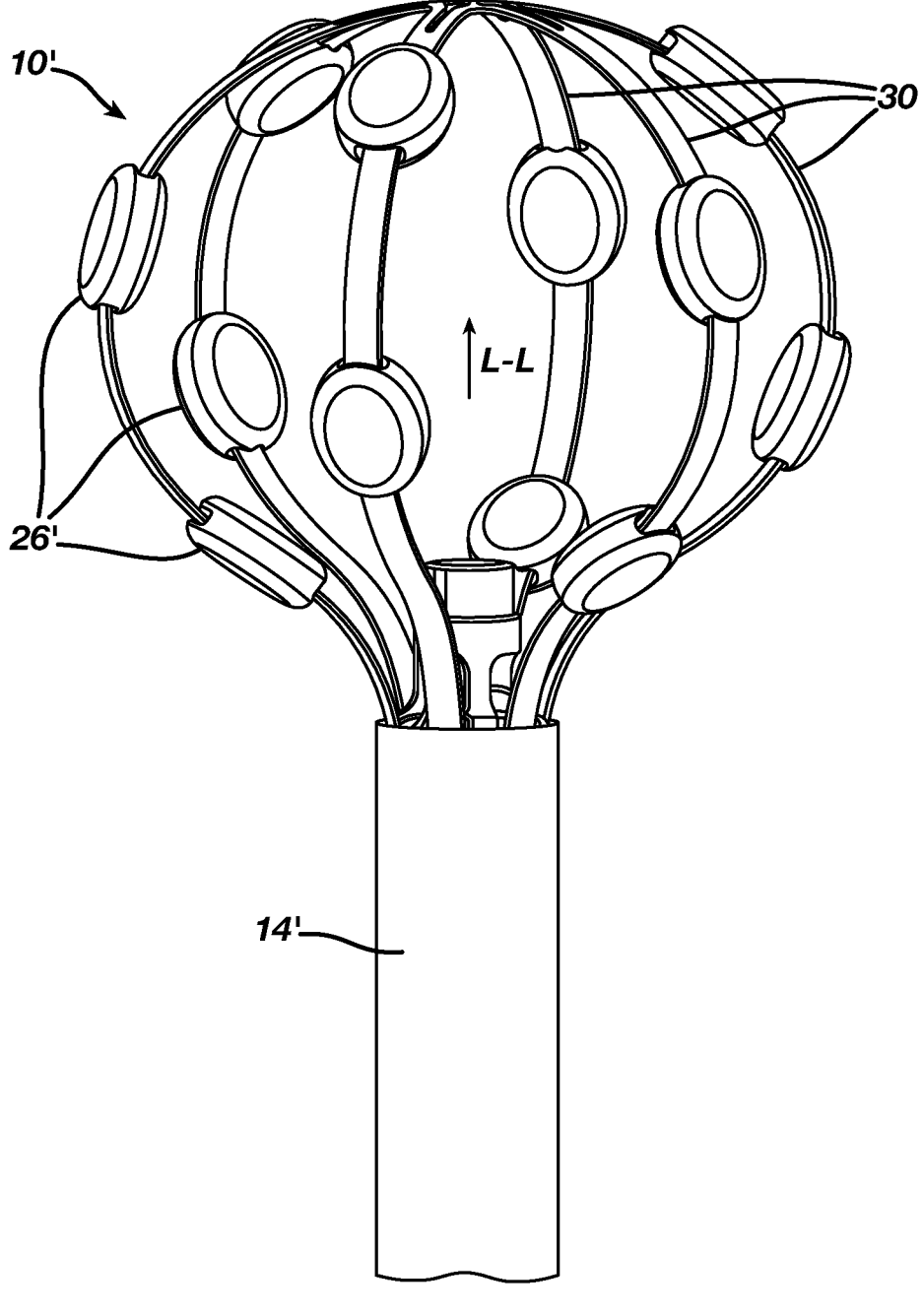
FIG. 8 is an illustration of another example catheter according to aspects of the present invention.

FIG. 8 is an illustration of another example catheter 10' configured for IRE ablation and having electrodes 26' disposed on a plurality of spines 30. The catheter 10' includes wires 100, 200 to each of the electrodes 26' that extend through a shaft 14'. The catheter 10' includes twelve (12) electrodes 26', and therefore twelve (12) wires 100, 200.

As illustrated, the spines 30 are expanded from the longitudinal axis L-L to form a basket shape that is approximately spherical. The spines 30 can be compressed to the longitudinal axis L-L to an elongated configuration that is sized to traverse vasculature. The electrodes 26' can be positioned over the spines 30 as illustrated or otherwise attached to the spines 30 as understood by a person skilled in the pertinent art.

The catheter 10' is preferably configured to provide IRE ablation voltage pulses between pairs of electrodes 26'. The IRE pulses, alone or in combination with RF ablation, can be generated and applied in various treatments such as described in references attached in the Appendix to priority application U.S. 63/301,082.

The present disclosure also includes additional example catheters each including example wire(s) 100, 200 as disclosed herein. For instance, example catheters can include features disclosed in U.S. Pat. Nos. 5,718,241, 6,198,974, 6,484,118, 6,987,995, 7,142,903, 7,274,957, 7,377,906, 7,591,799, 7,593,760, 7,720,517, 7,853,302, 8,000,765, 8,021,327, 8,275,440, and 11,071,585, the entireties of each of which are incorporated herein by reference and attached in the Appendix to priority application U.S. 63/301,082. The catheters disclosed in the Appendix to priority application U.S. 63/301,082 can be modified to include wire(s) 100, 200 to ablation electrodes as understood by a person skilled in the pertinent art.

The present disclosure also includes additional example systems and methods for reversible and/or irreversible electroporation modified to utilize the example catheters 10, 10' illustrated herein and/or modified catheters as disclosed in the preceding paragraph as understood by a person skilled in the pertinent art. For instance, example systems and method can include features disclosed in U.S. Patent Pub. Nos. 2021/0169550, 2021/0169567, 2021/0169568, 2021/0161592, 2021/0196372, 2021/0177503, 2021/0186604, and 2021/0162210, the entireties of each of which are incorporated herein by reference and attached in the Appendix to priority application U.S. 63/301,082. Further, the catheters disclosed in these publications can be modified to include wire(s) 100, 200 to ablation electrodes as understood by a person skilled in the pertinent art.

The devices and/or methods of this disclosure reduced and/or eliminated arcing and noise during the application of IRE currents. The specific configurations, choice of materials and the size and shape of various elements can be varied according to design specifications or constraints.

Such changes are intended to be embraced within the scope of the disclosed technology. The presently disclosed embodiments, therefore, are considered in all respects to be illustrative and not restrictive. It will therefore be apparent from the foregoing that while particular forms of the disclosure have been illustrated and described, various modifications can be made without departing from the spirit and scope of the disclosure and all changes that come within the meaning and range of equivalents thereof are intended to be embraced therein.

The following clauses list non-limiting embodiments of the disclosure:

1. An intravascular device comprising:
an elongated shaft extending along a longitudinal axis and sized to traverse vasculature;
a distal section comprising a plurality of electrodes configured to deliver at least 900 VDC for irreversible electroporation; and
a plurality of wires each electrically joined to a respective electrode of the plurality of electrodes, each of the wires of the plurality of wires extending through at least a portion of the elongated shaft, and each of the wires of the plurality of wires respectively comprising:
an electrically conductive core material comprising a first electrical conductivity,
an electrically conductive cover material comprising a second electrical conductivity less than the first electrical conductivity, the electrically conductive cover material circumscribing the electrically conductive core material, and
an insulative jacket circumscribing the electrically conductive cover material such that no electrical arc is generated between the plurality of wires during delivery of at least 900 Volts to each electrode.

2. The intravascular device of clause 1, the electrically conductive core material comprising about 12% to about 50% of silver.

3. The intravascular device of clause 2, the electrically conductive core material comprising about 28% to about 33% of silver.

4. The intravascular device of any one of clauses 1-3, the electrically conductive core material comprising about 12% to about 50% of copper.

5. The intravascular device of any one of clauses 1-4, the first electrical conductivity being about $4 \times 10^7$ S/m to about $6 \times 10^7$ S/m when measured at 20° C.

6. The intravascular device of any one of clauses 1-5, the second electrical conductivity being about $1 \times 10^6$ S/m when measured at 20° C.

7. The intravascular device of any one of clauses 1-6, the first electrical conductivity being at least ten times greater than the second electrical conductivity when measured at 20° C.

8. The intravascular device of any one of clauses 1-7,
the electrically conductive core material comprising a first thermal conductivity, and
the electrically conductive cover material comprising a second thermal conductivity less than the first thermal conductivity.

9. The intravascular device of clause 8, the first thermal conductivity being about 300 W/mK to about 400 W/mK.

10. The intravascular device of clause 8 or 9, the second thermal conductivity being about 11.2 W/mK.

11. The intravascular device of any one of clauses 8-10, the first thermal conductivity being at least ten times the second thermal conductivity.

12. The intravascular device of any one of clauses 1-11, each of the wires of the plurality of wires comprising a resistance per length of wire measuring about 1.4 Ω/ft (4.6 Ω/m) to about 1.8 Ω/ft (5.8 Ω/m).

13. The intravascular device of any one of clauses 1-12, each of the wires of the plurality of wires comprising a wire resistance of about 10Ω to about 12Ω.

14. The intravascular device of any one of clauses 1-13, each of the electrically conductive cover material of the plurality of wires comprising a diameter measuring between about 0.0031 inches (79 micrometers) to about 0.0040 inches (102 micrometers).

15. An intravascular device comprising:
an elongated shaft extending along a longitudinal axis and sized to traverse vasculature;
a distal section comprising a plurality of electrodes; and
a plurality of wires each electrically joined to a respective electrode of the plurality of electrodes, each of the wires of the plurality of wires extending through at least a portion of the elongated shaft, and each of the wires of the plurality of wires respectively comprising:
a plurality of strands, each strand respectively comprising an electrically conductive core material comprising a first electrical conductivity and an electrically conductive cover material comprising a second electrical conductivity less than the first electrical conductivity, the electrically conductive cover material circumscribing the electrically conductive core material, and
an insulative jacket circumscribing the plurality of strands so that no electrical arc is generated between the plurality of wires when at least 900 Volts is provided to each electrode.

16. The intravascular device of clause 15, the electrically conductive core material of each of the strands comprising about 41% silver (Ag).

17. The intravascular device of clause 15 or 16, each strand comprising a diameter measuring about 0.002 inches (51 micrometers).

18. The intravascular device of any one of clauses 15-17, at least a portion of the wires of the plurality of wires comprising exactly four (4) strands.

19. The intravascular device of any one of clauses 15-18, at least a portion of the strands of the plurality of strands comprising a resistance of about 20Ω.

20. The intravascular device of any one of clauses 1-19, each of the plurality of wires being configured to withstand bipolar pulses resulting in a voltage difference of about 1,500 volts to about 2,000 volts between two wires in the plurality of wires.

21. The intravascular device of clause 20, each of the plurality of wires being configured to withstand bipolar pulses resulting in a voltage difference of about 1,500 volts between two wires in the plurality of wires.

22. The intravascular device of clause 20, each of the plurality of wires being configured to withstand bipolar pulses resulting in a voltage difference that is between 1,800 volts and 2,000 volts between two wires in the plurality of wires.

23. The intravascular device of any one of clauses 1-22, the distal section comprising a lasso region upon which the plurality of electrodes are mounted, the lasso region being configured to move between an elongated configuration aligned to the longitudinal axis to a circular shape generally orthogonal to the longitudinal axis.

24. The intravascular device of any one of clauses 1-22, the distal section comprising a plurality of spines upon which the plurality of electrodes are mounted, the spines being configured to move from an elongated configuration aligned to the longitudinal axis such that the spines bow outwardly from the longitudinal axis to form an expanded form.

25. The intravascular device of any one of clauses 1-24, the plurality of wires comprising 12 to 8 wires.

26. The intravascular device of any one of clauses 1-25, the elongated shaft having a diameter of about 8.5 French (2.8 millimeters).

27. The intravascular device of any one of clauses 1-26, the plurality of wires being bundled in an insulative sleeve.

28. The intravascular device of any one of clauses 1-27, each wire of the plurality of wires comprising a diameter measuring about 0.0053 inches (130 micrometers).

29. The intravascular device of any one of clauses 1-28, the insulative jacket comprising a wall thickness measuring about 0.0008 inches (20 micrometers) to about 0.00125 inches (32 micrometers).

30. The intravascular device of any one of clauses 1-29, the electrically conductive cover material comprising about 33% to about 37% nickel, about 30% to about 38% cobalt, about 19% to about 21% chromium, and about 9% to about 10.5% molybdenum.

31. The intravascular device of clause 30, the electrically conductive cover material further comprising about 1% iron.

32. The intravascular device of clause 30 or 21, the electrically conductive cover material further comprising less than 1% of at least one element of a group of elements consisting of: carbon, manganese, silicon, phosphorus, sulfur, titanium, and boron.

What is claimed is:

1. An intravascular device comprising:
an elongated shaft extending along a longitudinal axis and sized to traverse vasculature;
a distal section comprising a plurality of electrodes configured to deliver at least 900VDC for irreversible electroporation; and
a plurality of wires each electrically joined to a respective electrode of the plurality of electrodes, each of the wires of the plurality of wires extending through at least a portion of the elongated shaft, and each of the wires of the plurality of wires respectively comprising:
an electrically conductive core material comprising a first electrical conductivity,
an electrically conductive cover material comprising a second electrical conductivity less than the first electrical conductivity, the electrically conductive cover material circumscribing the electrically conductive core material, and
an insulative jacket circumscribing the electrically conductive cover material such that no electrical arc is generated between the plurality of wires during delivery of at least 900 Volts to each electrode.

2. The intravascular device of claim 1, the electrically conductive core material comprising about 12% to about 50% of silver.

3. The intravascular device of claim 2, the electrically conductive core material comprising about 28% to about 33% of silver.

4. The intravascular device of claim 1, the electrically conductive core material comprising about 12% to about 50% of copper.

5. The intravascular device of claim 1, the first electrical conductivity being about $4\times10^7$ S/m to about $6\times10^7$ S/m when measured at 20° C.

6. The intravascular device of claim 1, the second electrical conductivity being about $1\times10^6$ S/m when measured at 20° C.

7. The intravascular device of claim 1, the first electrical conductivity being at least ten times greater than the second electrical conductivity when measured at 20° C.

8. The intravascular device of claim 1,
the electrically conductive core material comprising a first thermal conductivity, and
the electrically conductive cover material comprising a second thermal conductivity less than the first thermal conductivity.

9. The intravascular device of claim 8, the first thermal conductivity being about 300 W/mK to about 400 W/mK.

10. The intravascular device of claim 8, the second thermal conductivity being about 11.2 W/mK.

11. The intravascular device of claim 8, the first thermal conductivity being at least ten times the second thermal conductivity.

12. The intravascular device of claim 1, each of the wires of the plurality of wires comprising a resistance per length of wire measuring about 1.4 Ω/ft (4.6 Ω/m) to about 1.8 Ω/ft (5.8 Ω/m).

13. The intravascular device of claim 1, each of the wires of the plurality of wires comprising a wire resistance of about 10 Ω to about 12 Ω.

14. The intravascular device of claim 1, each of the electrically conductive cover material of the plurality of wires comprising a diameter measuring between about 0.0031 inches (79 micrometers) to about 0.0040 inches (102 micrometers).

15. An intravascular device comprising:
an elongated shaft extending along a longitudinal axis and sized to traverse vasculature;
a distal section comprising a plurality of electrodes; and
a plurality of wires each electrically joined to a respective electrode of the plurality of electrodes, each of the wires of the plurality of wires extending through at least a portion of the elongated shaft, and each of the wires of the plurality of wires respectively comprising:
a plurality of strands, each strand respectively comprising an electrically conductive core material comprising a first electrical conductivity and an electrically conductive cover material comprising a second electrical conductivity less than the first electrical conductivity, the electrically conductive cover material circumscribing the electrically conductive core material, and
an insulative jacket circumscribing the plurality of strands so that no electrical arc is generated between the plurality of wires when at least 900 Volts is provided to each electrode.

16. The intravascular device of claim 15, the electrically conductive core material of each of the strands comprising about 41% silver (Ag).

17. The intravascular device of claim 15, each strand comprising a diameter measuring about 0.002 inches (51 micrometers).

18. The intravascular device of claim 15, at least a portion of the wires of the plurality of wires comprising exactly four (4) strands.

19. The intravascular device of claim 15, at least a portion of the strands of the plurality of strands comprising a resistance of about 20 Ω.

20. The intravascular device of claim 19, each of the plurality of wires being configured to withstand bipolar pulses resulting in a voltage difference of about 1,500 volts to about 2,000 volts between two wires in the plurality of wires.

* * * * *